US012601066B2

(12) United States Patent
Wei

(10) Patent No.: US 12,601,066 B2
(45) Date of Patent: Apr. 14, 2026

(54) PHOTOCATALYSTS FOR WATER OXIDATION

(71) Applicant: University of Florida Research Foundation, Inc., Gainesville, FL (US)

(72) Inventor: Wei David Wei, Gainesville, FL (US)

(73) Assignee: University of Florida Research Foundation, INC., Gainesville, FL (US)

(*) Notice: Subject to any disclaimer, the term of this patent is extended or adjusted under 35 U.S.C. 154(b) by 764 days.

(21) Appl. No.: 17/917,150

(22) PCT Filed: Apr. 6, 2021

(86) PCT No.: PCT/US2021/025991
§ 371 (c)(1),
(2) Date: Oct. 5, 2022

(87) PCT Pub. No.: WO2021/207221
PCT Pub. Date: Oct. 14, 2021

(65) Prior Publication Data

US 2023/0160073 A1 May 25, 2023

Related U.S. Application Data

(60) Provisional application No. 63/028,929, filed on May 22, 2020, provisional application No. 63/006,539, filed on Apr. 7, 2020.

(51) Int. Cl.
*C25B 1/04* (2021.01)
*B01J 19/12* (2006.01)
(Continued)

(52) U.S. Cl.
CPC ............... *C25B 1/04* (2013.01); *B01J 19/127* (2013.01); *B01J 35/39* (2024.01); *C25B 1/55* (2021.01);
(Continued)

(58) Field of Classification Search
CPC ................................... B01J 35/39; C25B 1/55
See application file for complete search history.

(56) References Cited

U.S. PATENT DOCUMENTS

| | | | | |
|---|---|---|---|---|
| 2015/0174569 | A1 | 6/2015 | Macyk et al. | |
| 2022/0347665 | A1* | 11/2022 | Soleymani | B01J 35/59 |

OTHER PUBLICATIONS

ISR Mailed Sep. 10, 2021; Application No. PCT/US20221/25991, pp. 1-10.

(Continued)

*Primary Examiner* — Hosung Chung
(74) *Attorney, Agent, or Firm* — Thomas Horstemeyer LLP.

(57) ABSTRACT

The present disclosure provides for a composition that includes a modified M/$TiO_2$ composite, method of making the modified M/$TiO_2$ composite, an electrode having modified M/$TiO_2$ composite surface and a photoelectrochemical cell including the electrode, and methods of photoelectrochemical oxidation of water. The modified M/$TiO_2$ composite can be used in an electrode configuration, for example, in a photoelectrochemical cell for the photoelectrochemical oxidation of water. The present disclosure provides for a modified M/$TiO_2$ composite that has a catechol compound (s) (e.g., oligo-catechol) adsorbed onto at least the M (metal) on the surface of the modified M/$TiO_2$ composite.

6 Claims, 24 Drawing Sheets

(51) Int. Cl.

| | |
|---|---|
| ***B01J 35/39*** | (2024.01) |
| ***C25B 1/55*** | (2021.01) |
| ***C25B 5/00*** | (2006.01) |
| ***C25B 11/081*** | (2021.01) |
| ***C25B 11/085*** | (2021.01) |
| ***C25B 11/087*** | (2021.01) |

(52) U.S. Cl.

CPC .............. *C25B 5/00* (2013.01); *C25B 11/081* (2021.01); *C25B 11/085* (2021.01); *C25B 11/087* (2021.01)

(56) References Cited

OTHER PUBLICATIONS

Zhang Y. et al., "Modulating multi-hole reaction pathways for photoelectrochemical water 7-12 oxidation on gold nanocatalysts", Energy & Environmental Science, Mar. 27, 2020 (Mar. 27, 2020), vol. 13, issue 5, pp. 1501-1508, retrieved from the Internet:< DOI: 1-6 10.1039/c9ee04192c >; see entire document, especially, p. 1502-1505 and p. 45 Supplementary Materials.

Huang J. et al., "Manipulating Atomic Structures at the Au/TiO2 Interface for 02 Activation", Journal of the American Chemical Society, Mar. 23, 2020 (Mar. 23, 2020}, vol. 142, issue 14, pp. 6456-6460; retrieved from the Internet:< DOI: 10.1021/jacs. 9b13453 >; see entire document, especially, p. 6456.

Tachan Z. et al., "The TiO2-Catechol Complex: Coupling Type II Sensitization with Efficient Catalysis of Water Oxidation", Advanced Energy Materials, 2014, vol. 4, issue 6, article No. 1301249, 7 pp.; retrieved from the Internet:< DOI: 10.1002/aenm.201301249 >; see entire document.

Liu L. et al., "Tailoring Cu valence and oxygen vacancy in Cu/TiO2 catalysts for enhanced CO2 photoreduction efficiency", Applied Catalysis B: Environmental, 2013, vol. 134-135, pp. 349-358; retrieved from the Internet: < DOI: 10.1016/j.apcatb. 2013.01 .040 >; see entire document.

* cited by examiner

FIG. 1.1A
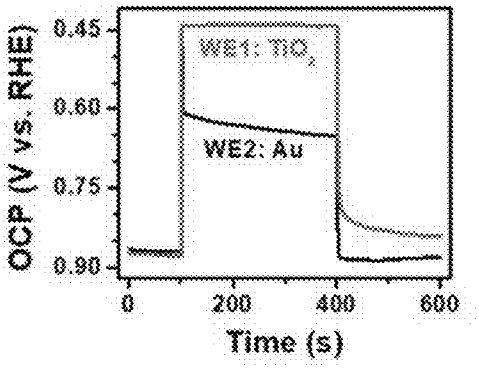
FIG. 1.1B
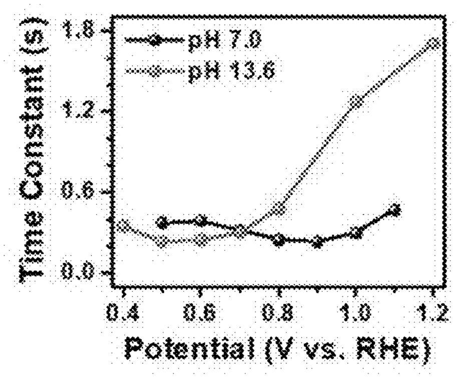
FIG. 1.1C
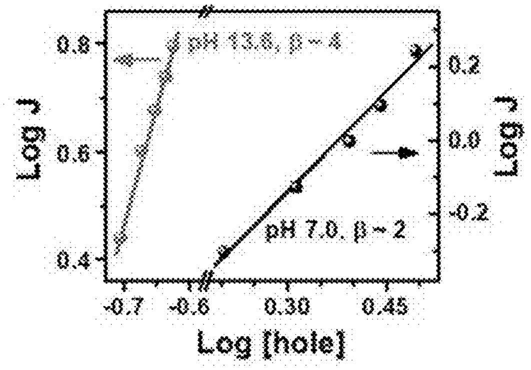
FIG. 1.1D
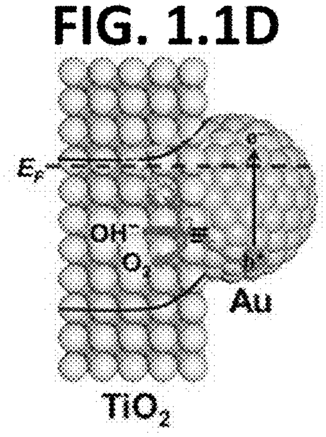
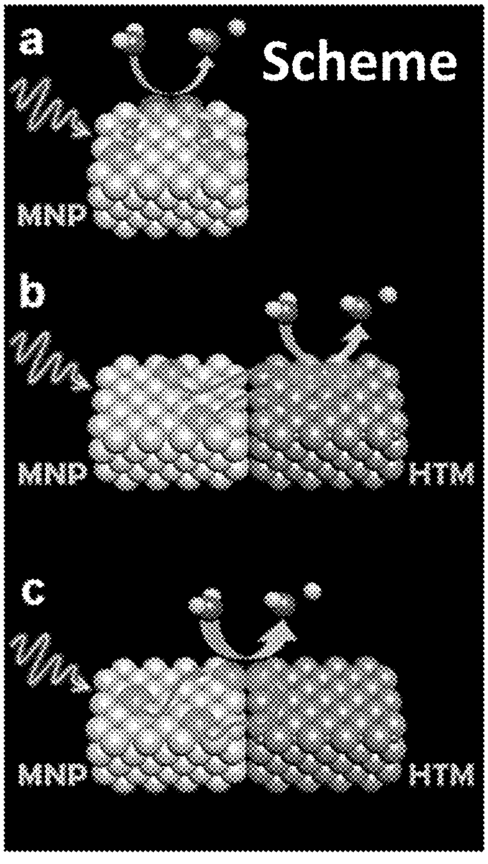
FIG. 1.1E FIG. 1.2A
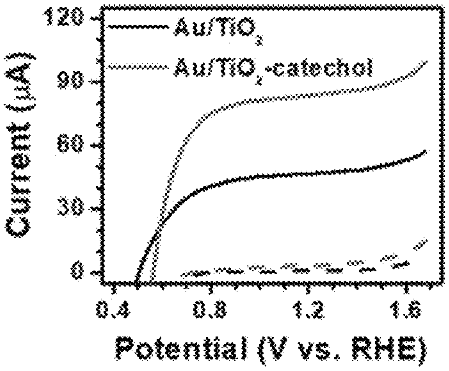
FIG. 1.2B
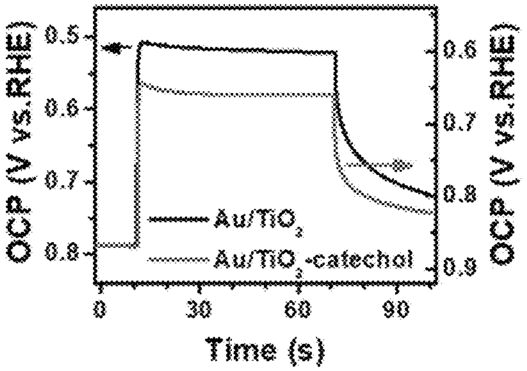
FIG. 1.2C
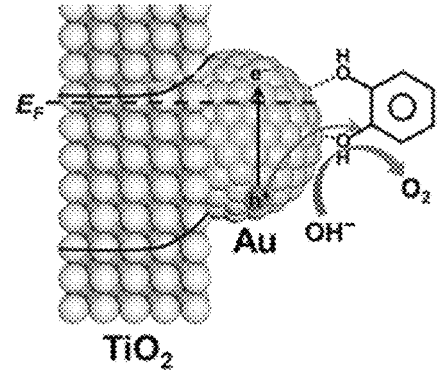
FIG. 1.2D
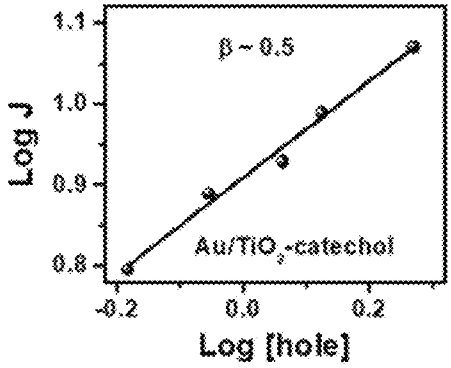
FIG. 1.3A
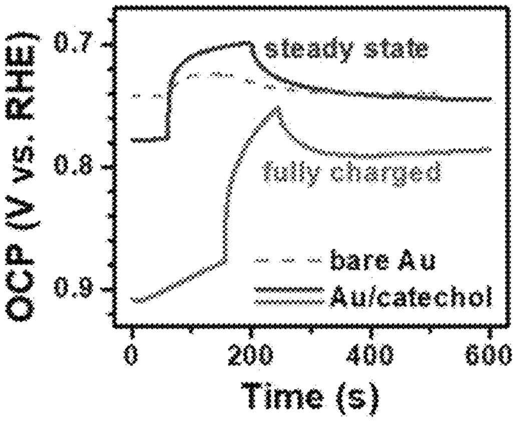
FIG. 1.3B
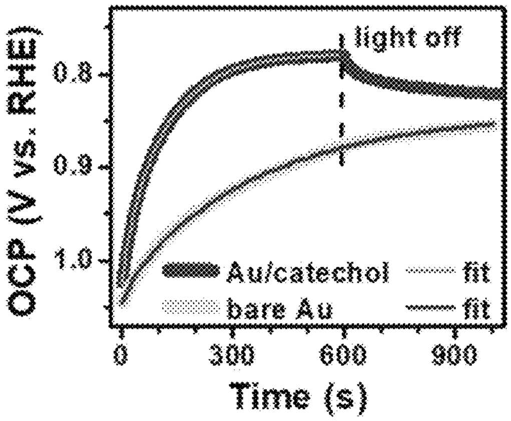

FIG. 1.4A
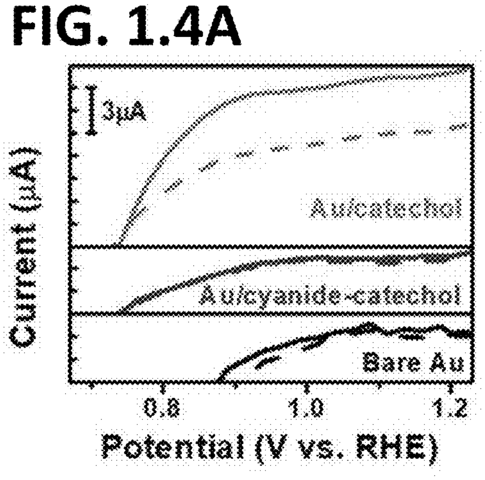
FIG. 1.4B
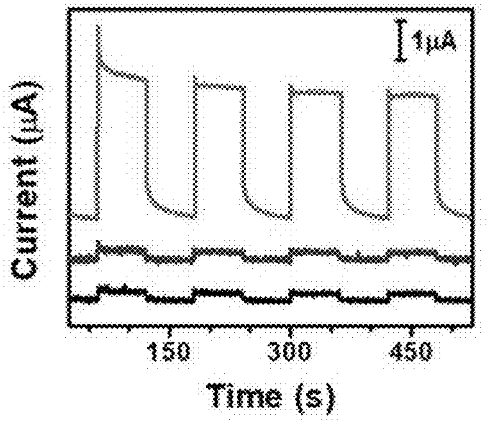
FIG. 1.4C
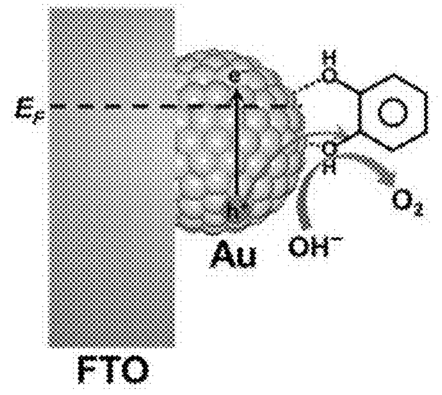
FIG. 1.4D
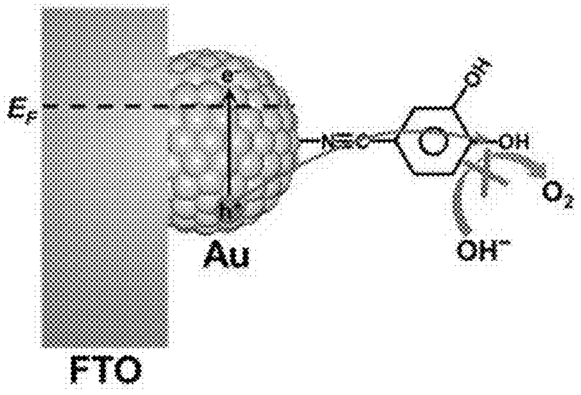
FIG. 1.5
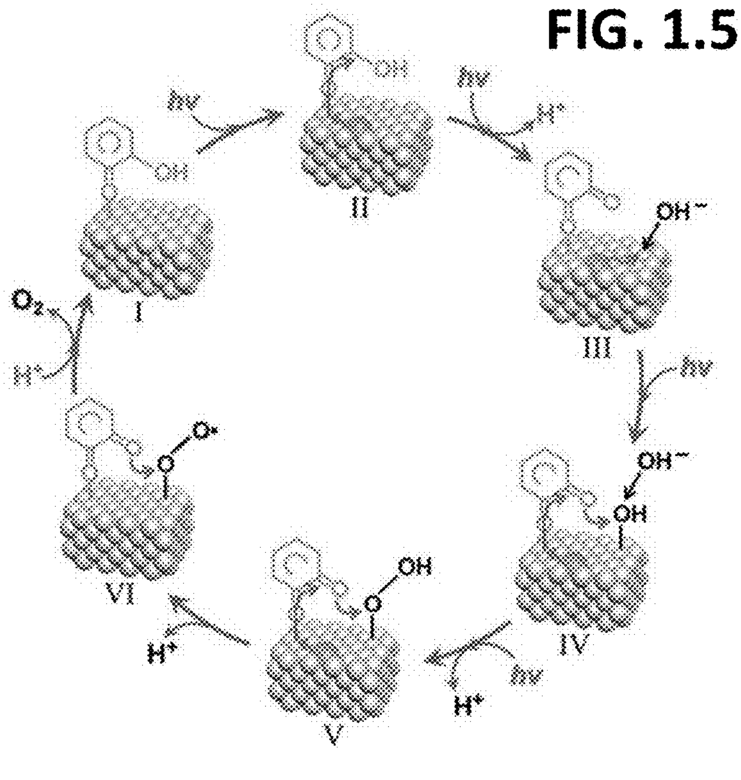

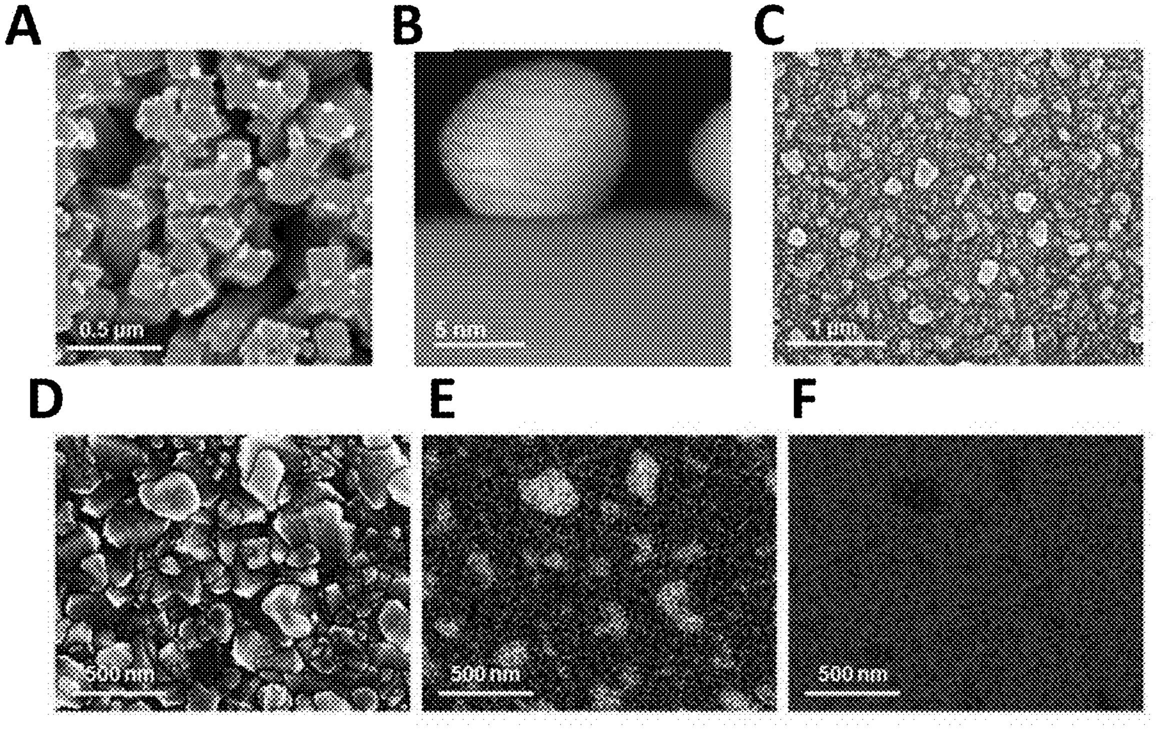
FIG. 2.1
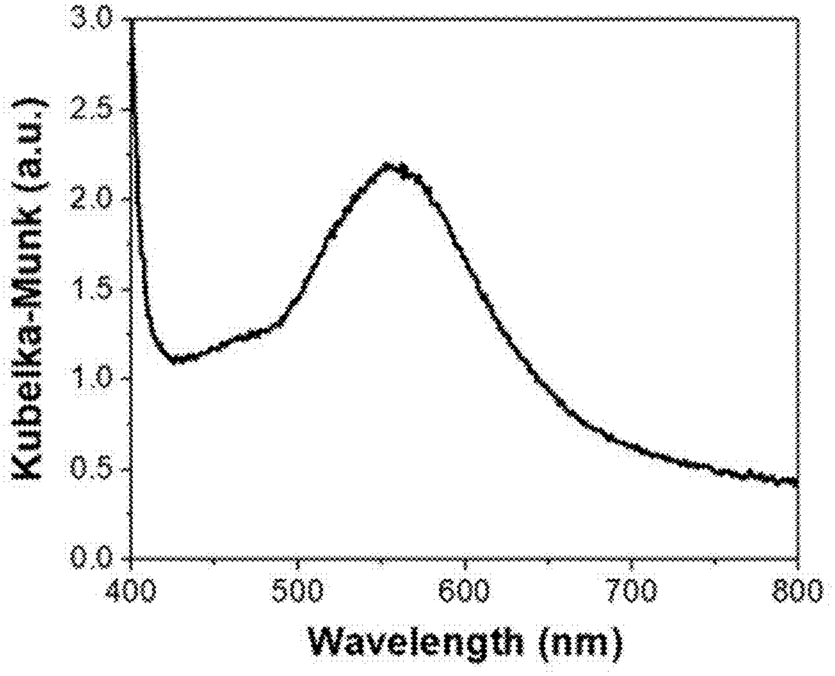
FIG. 2.2

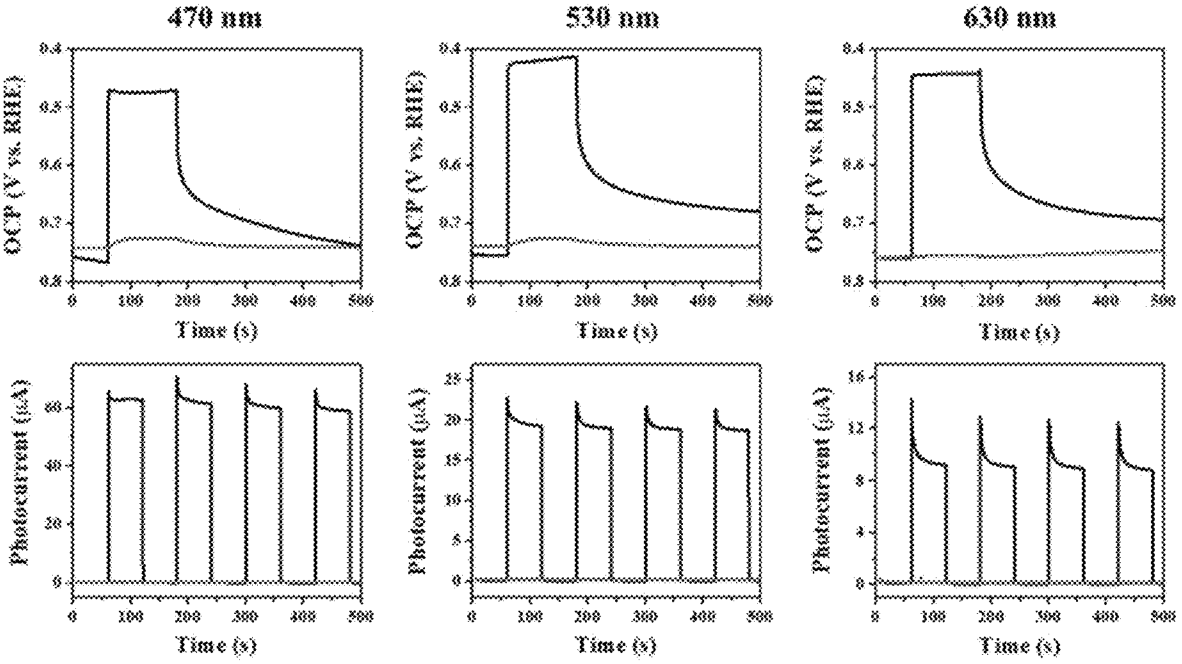
FIG. 2.3
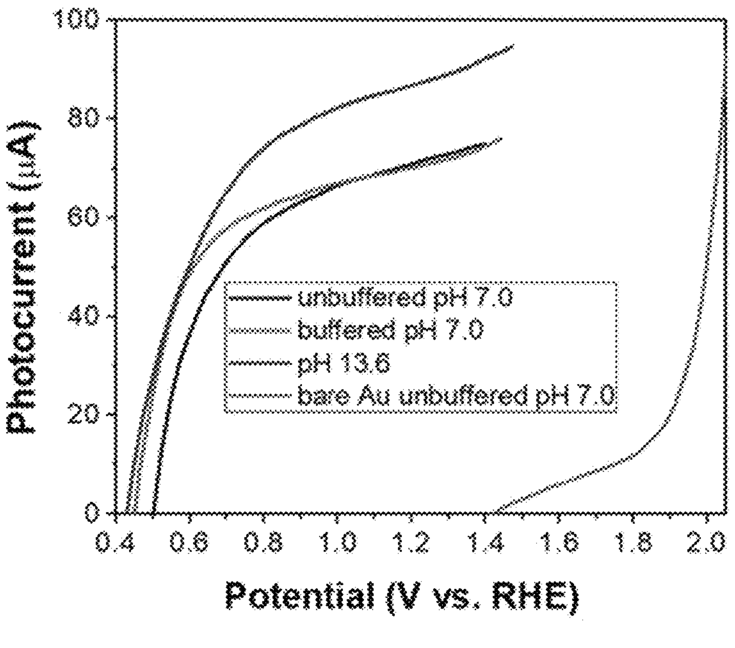
FIG. 2.4

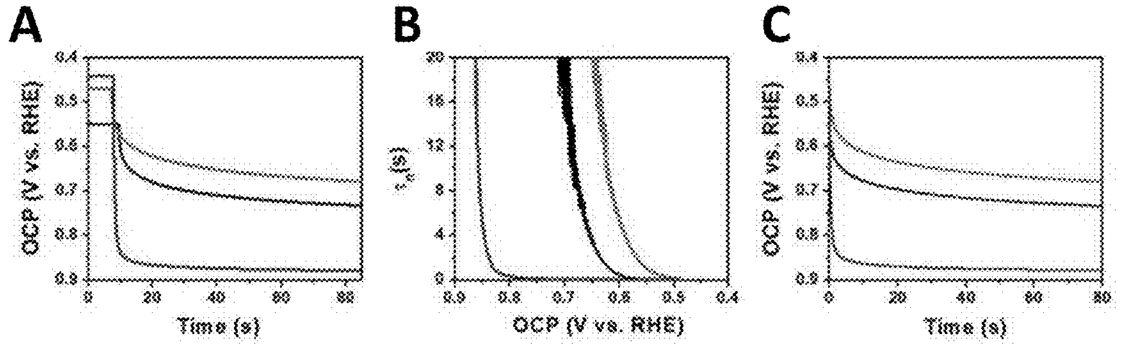
FIG. 2.5
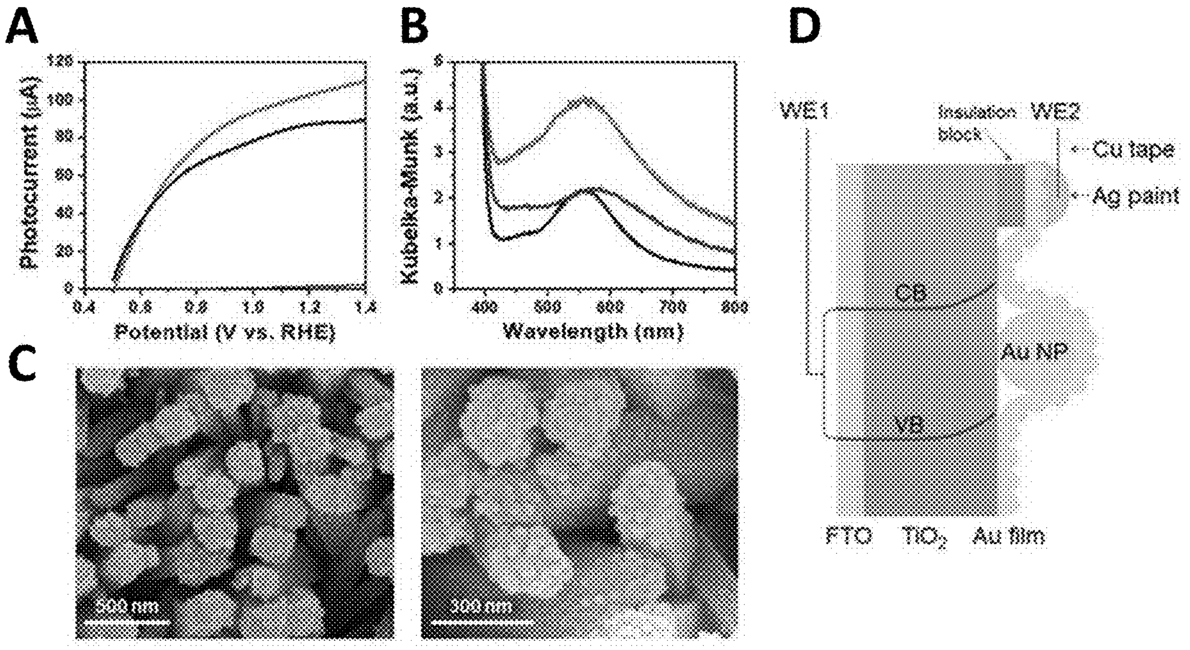
FIG. 2.6

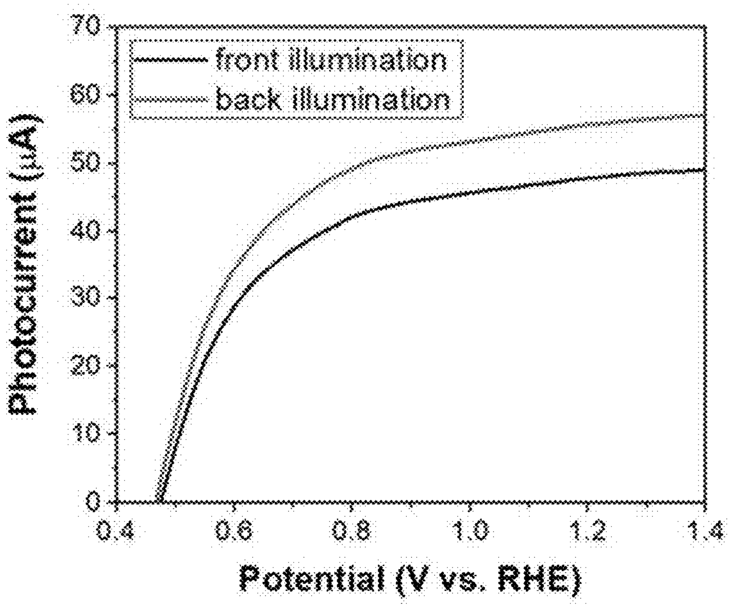
FIG. 2.7
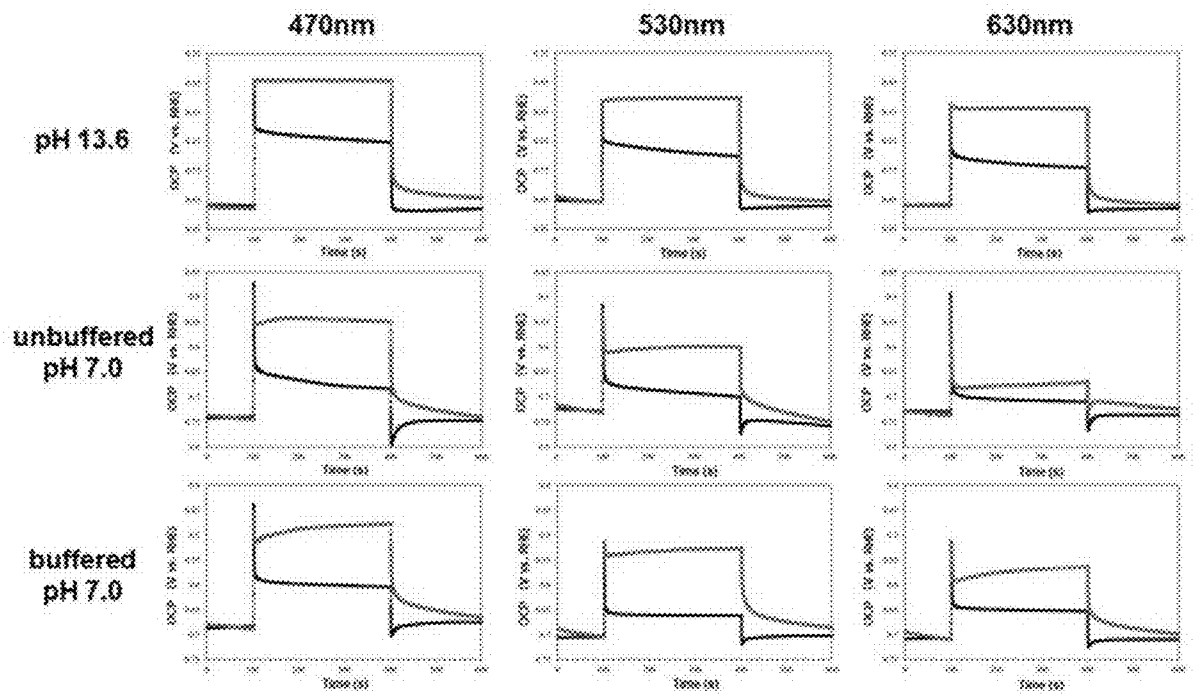
FIG. 2.8

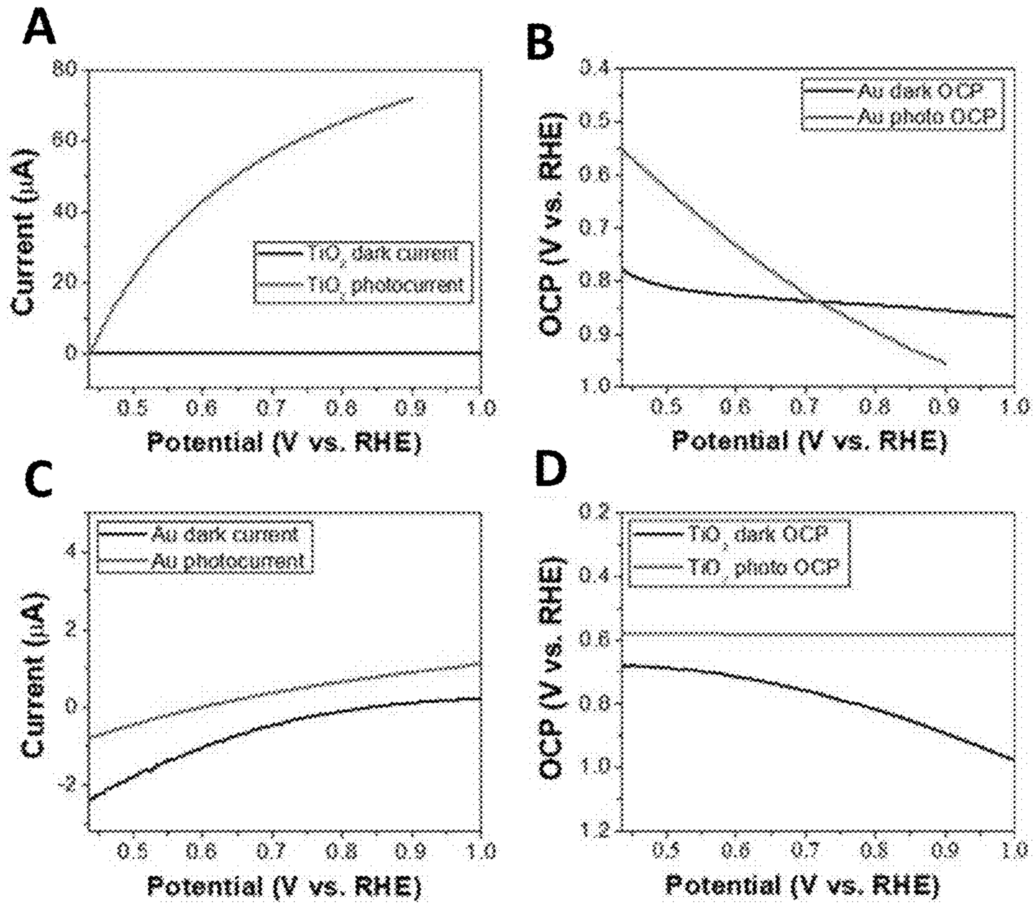
FIG. 2.9
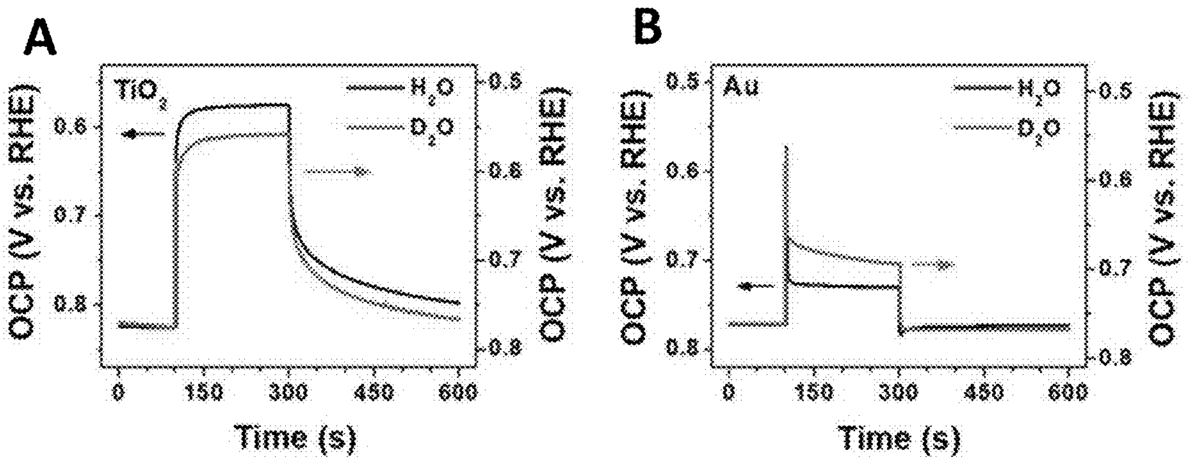
FIG. 2.10

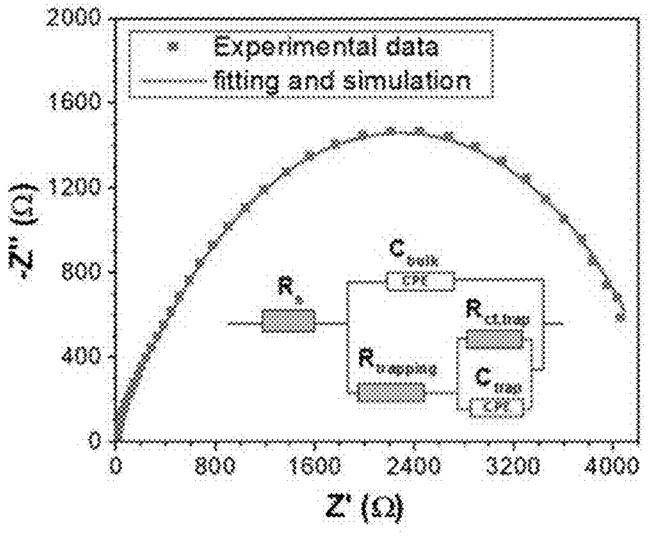
FIG. 2.11
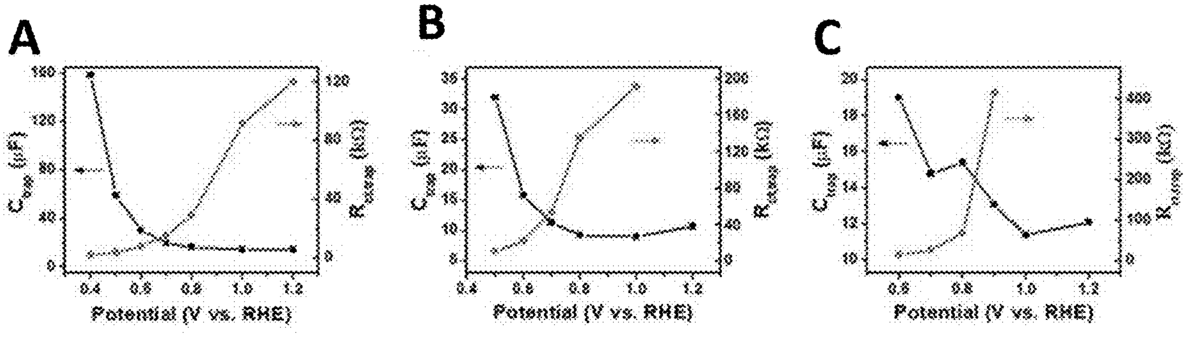
FIG. 2.12
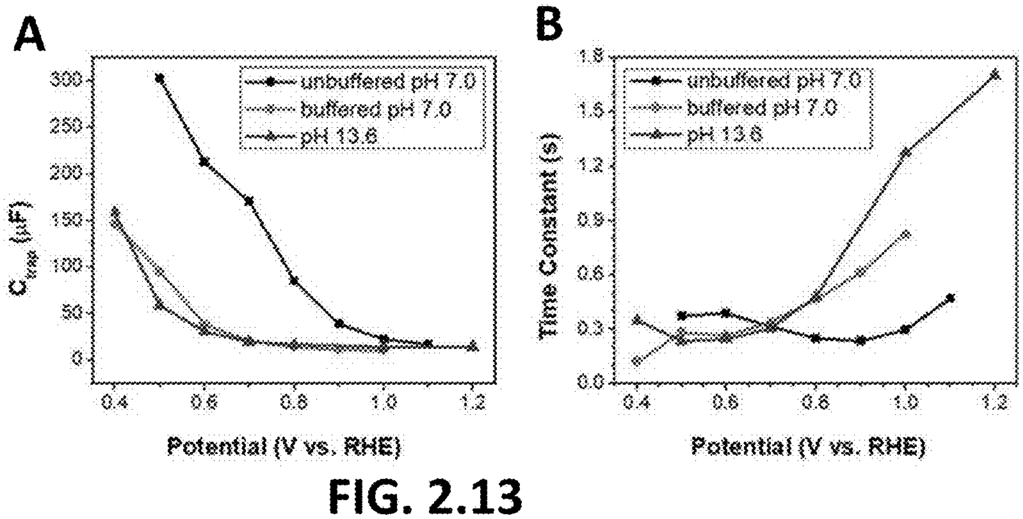
FIG. 2.13

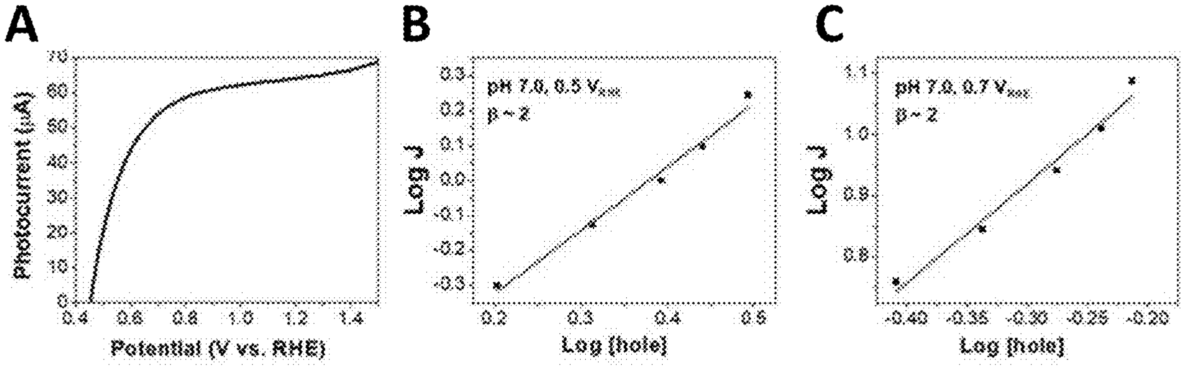
FIG. 2.14
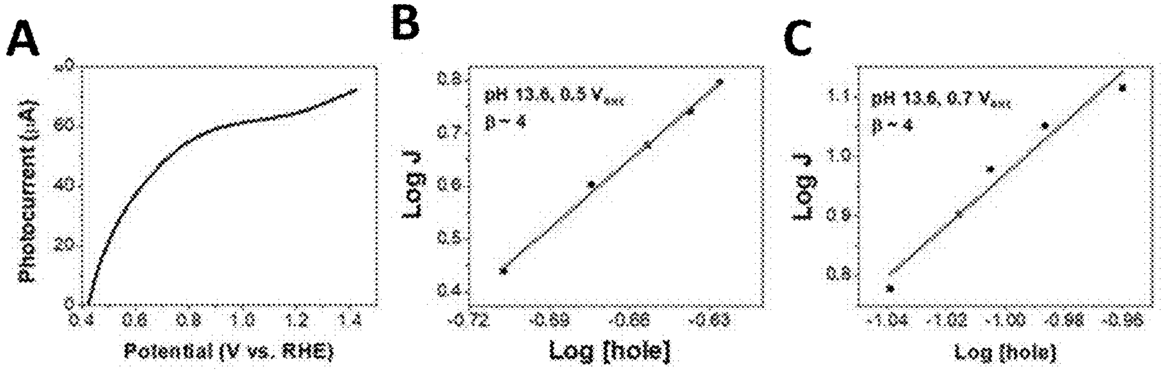
FIG. 2.15
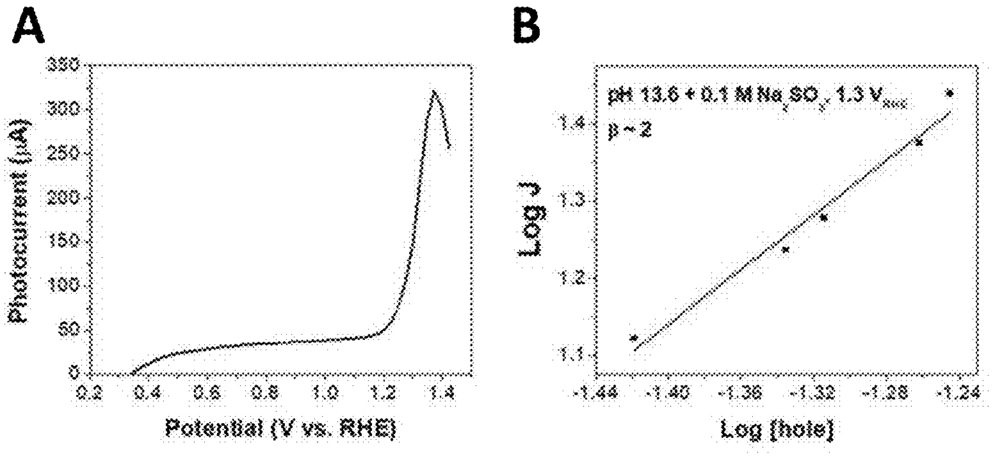
FIG. 2.16

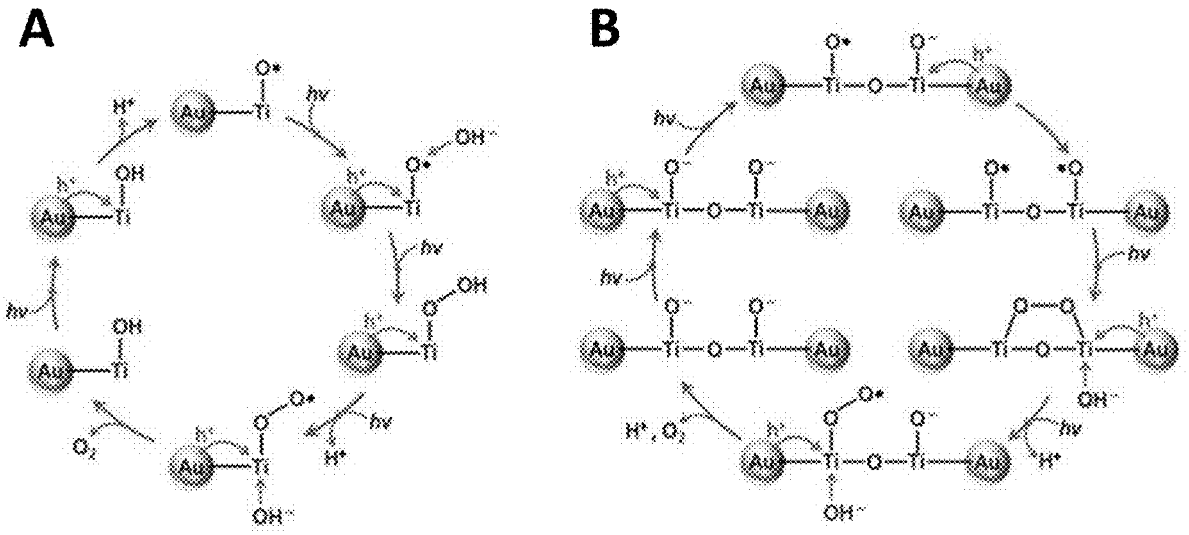
FIG. 2.17
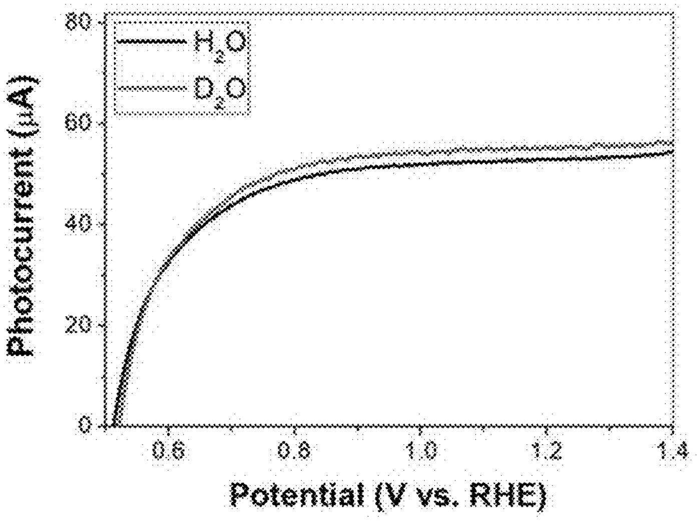
FIG. 2.18

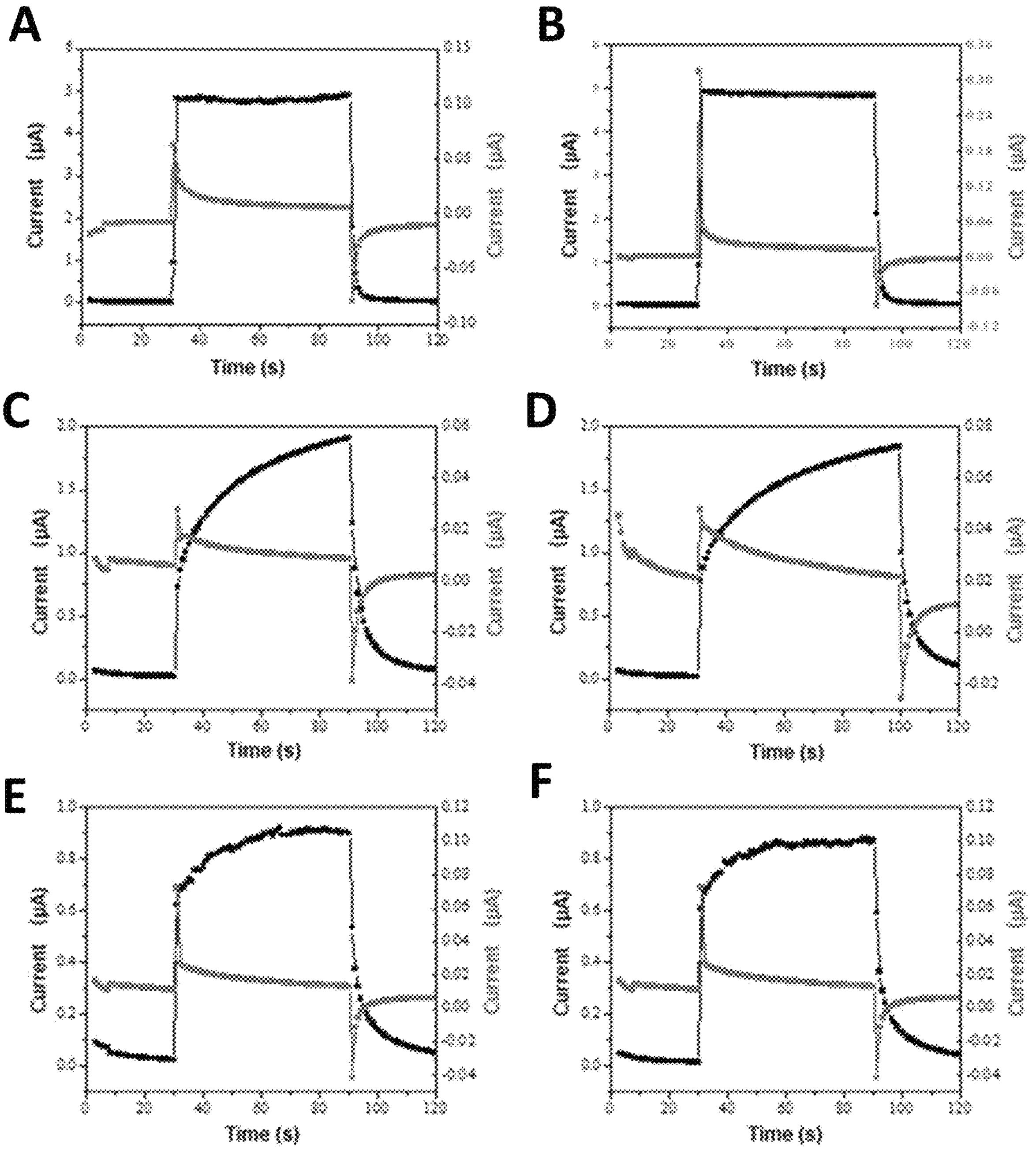
FIG. 2.19

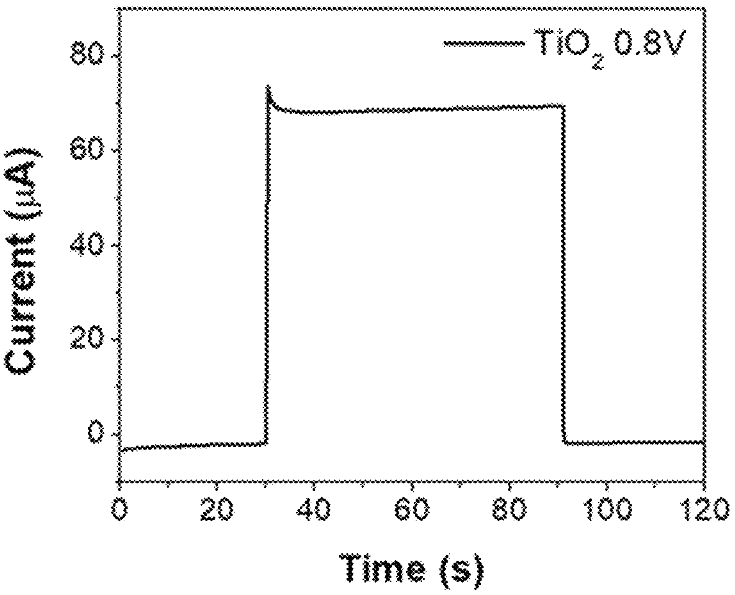
FIG. 2.20
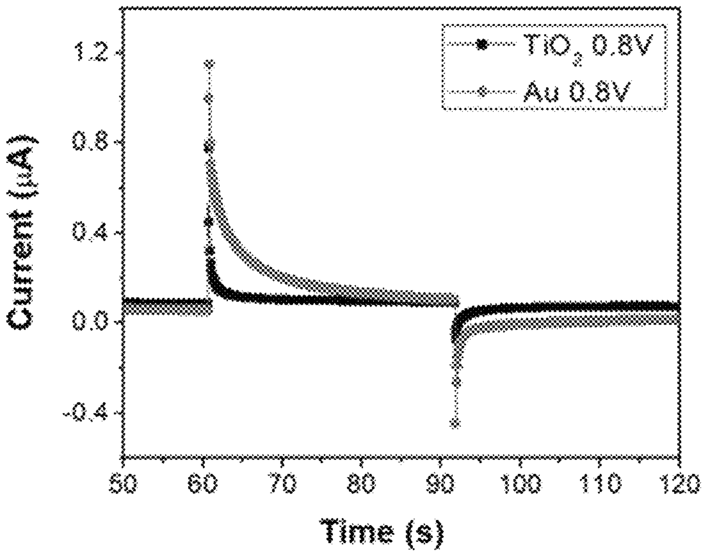
FIG. 2.21

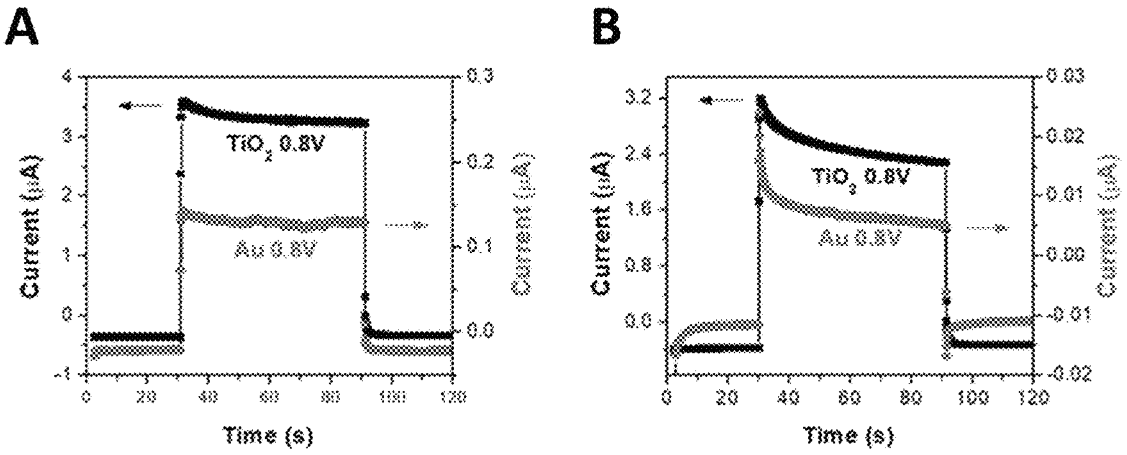
FIG. 2.22
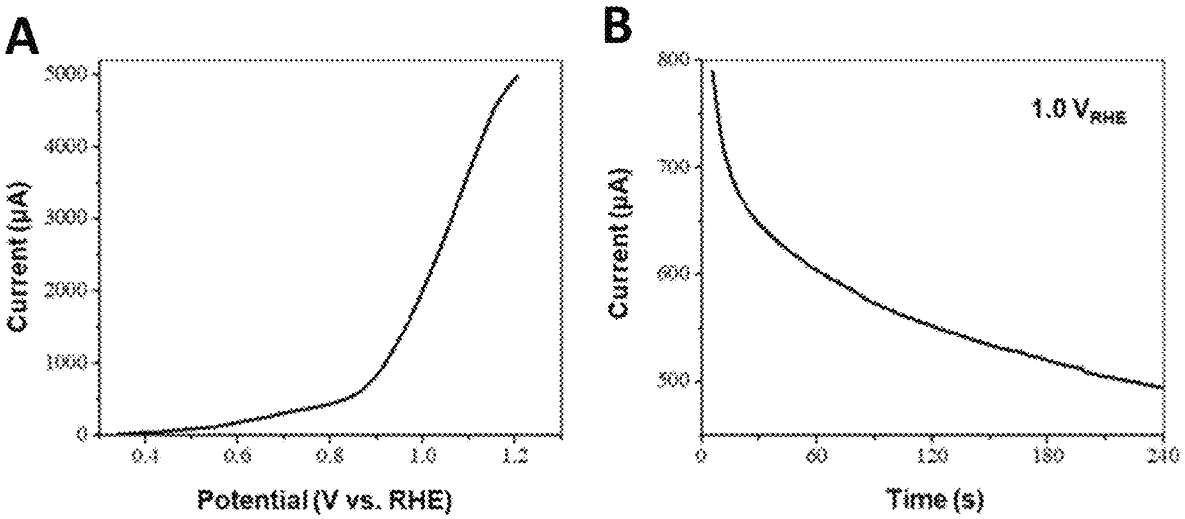
FIG. 2.23

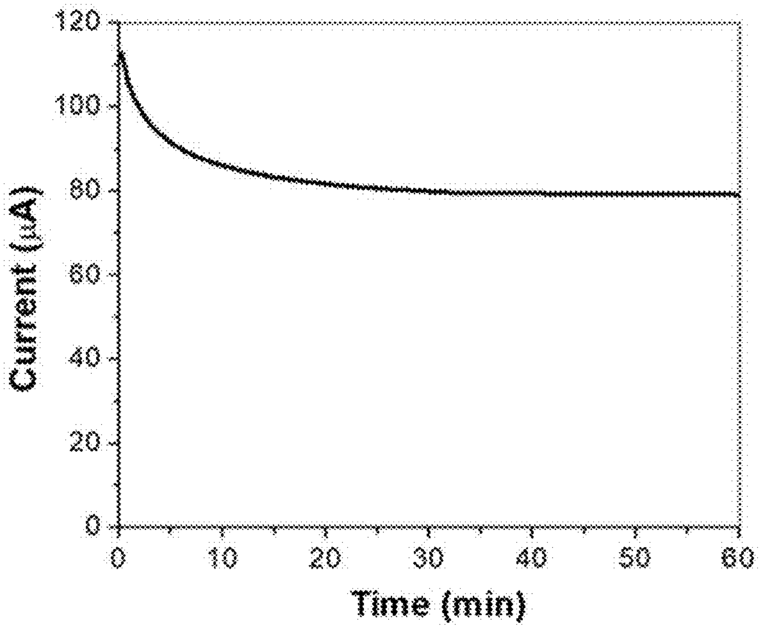
FIG. 2.24
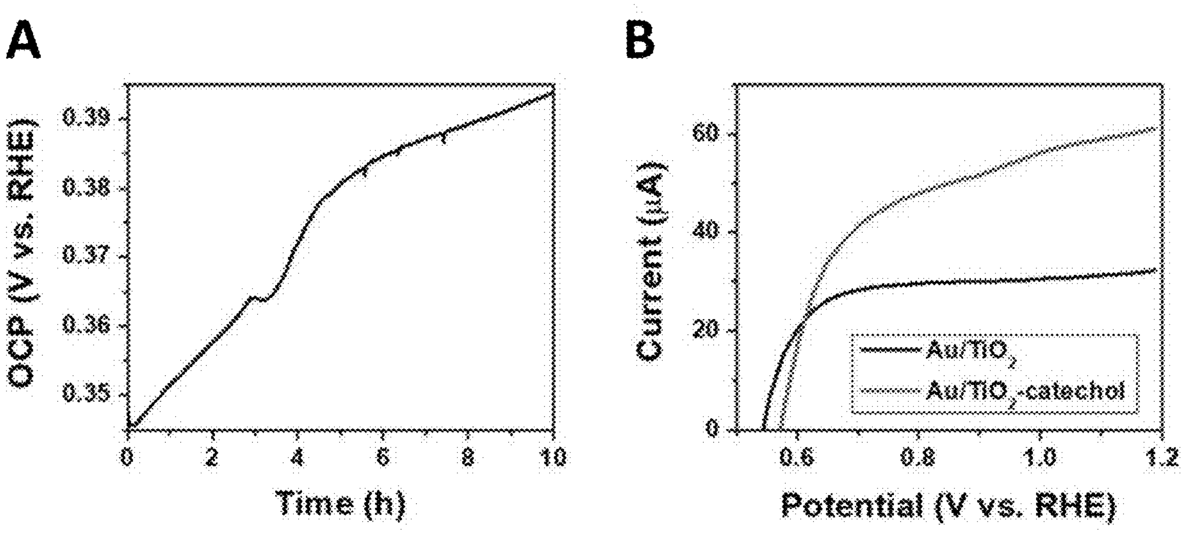
FIG. 2.25 a b
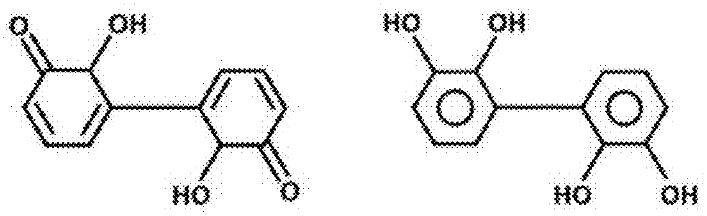
m/z=216 m/z=218
FIG. 2.26
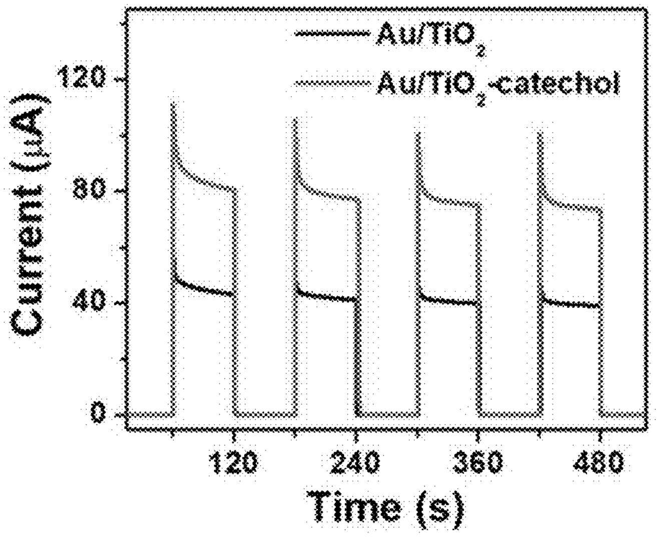
FIG. 2.27
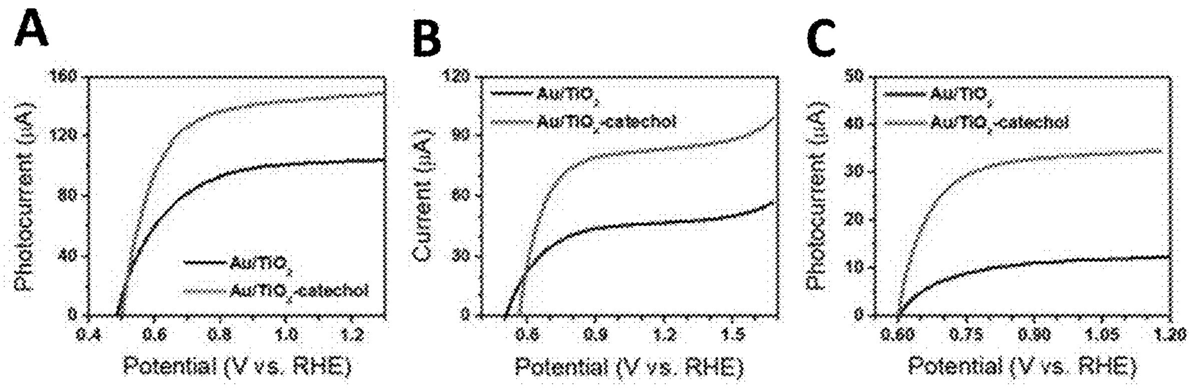
FIG. 2.28

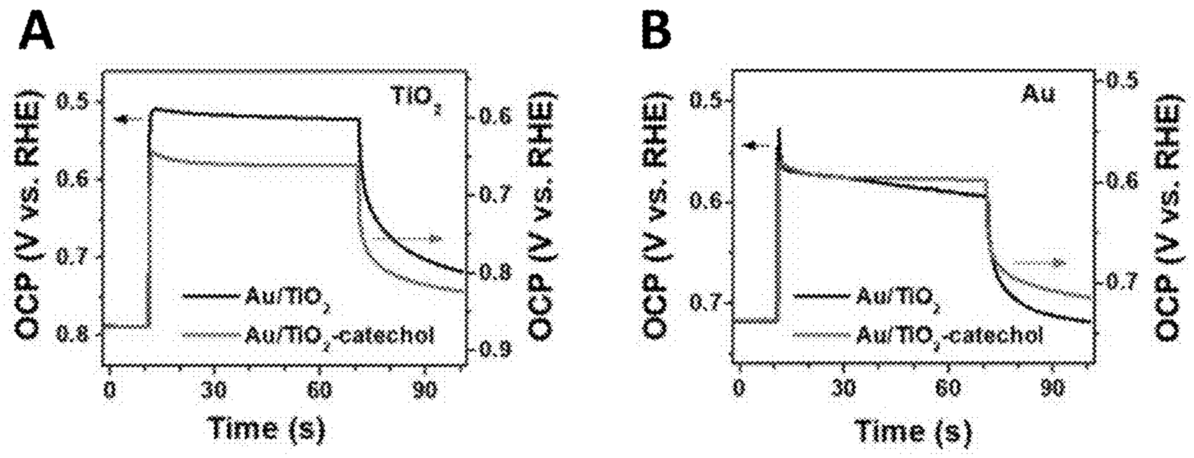
FIG. 2.29
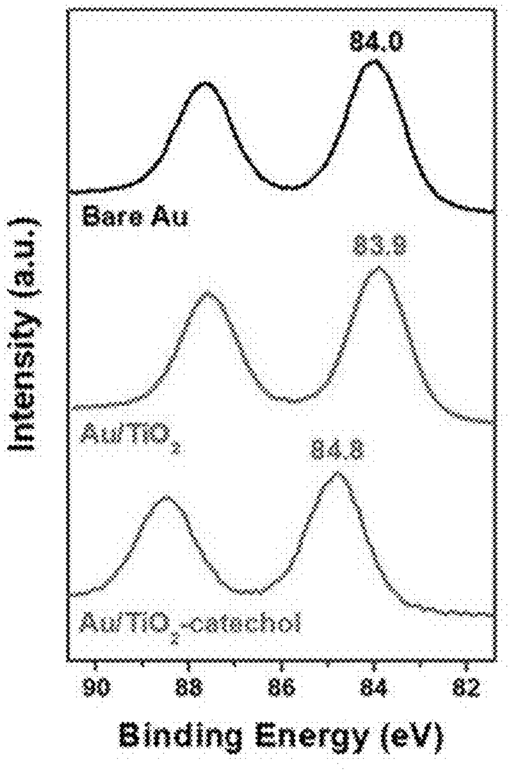
FIG. 2.30

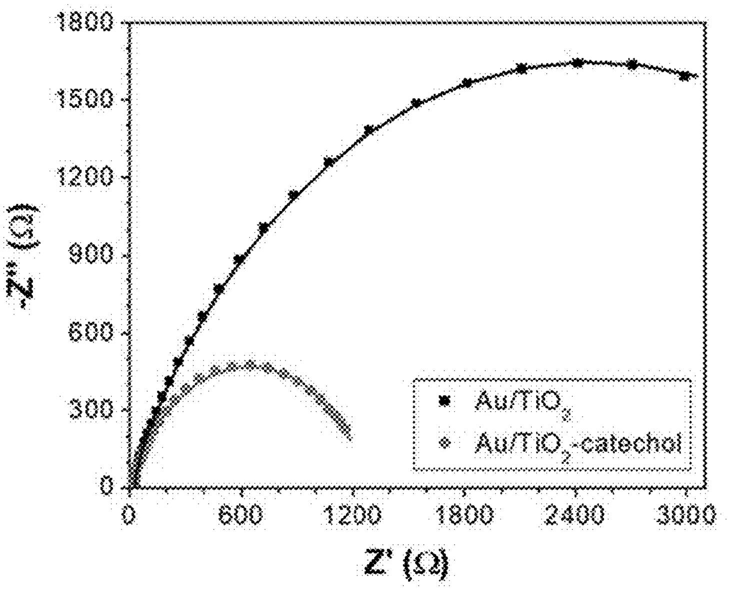
FIG. 2.31
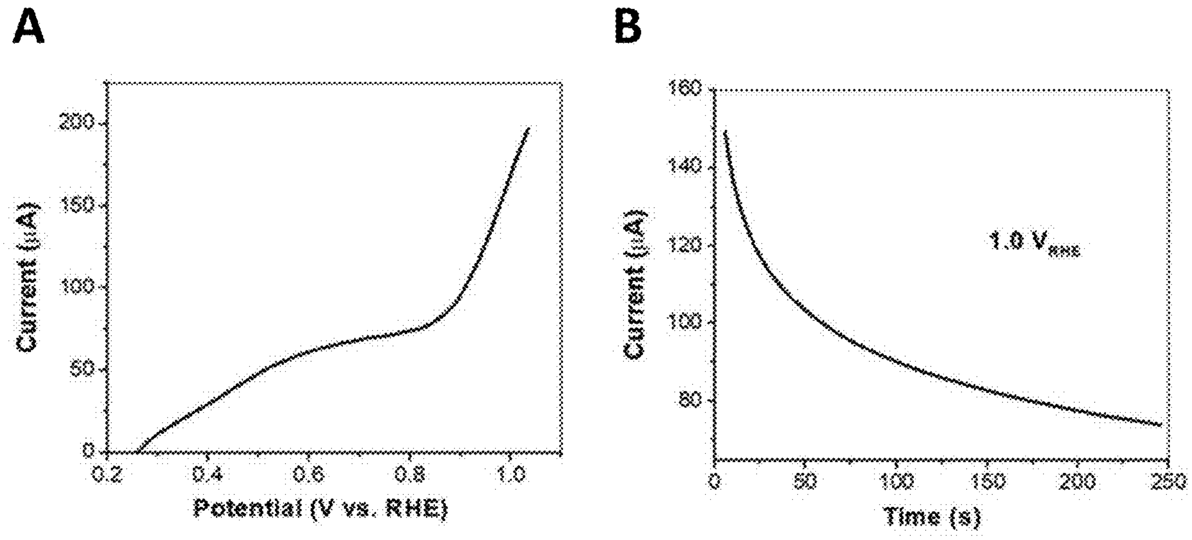
FIG. 2.32

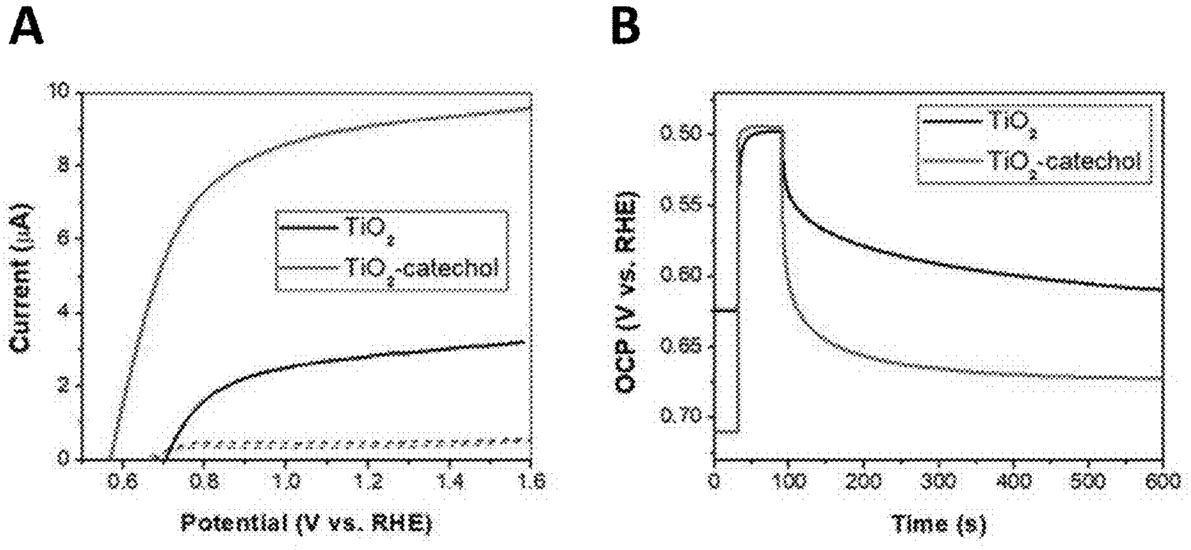
FIG. 2.33
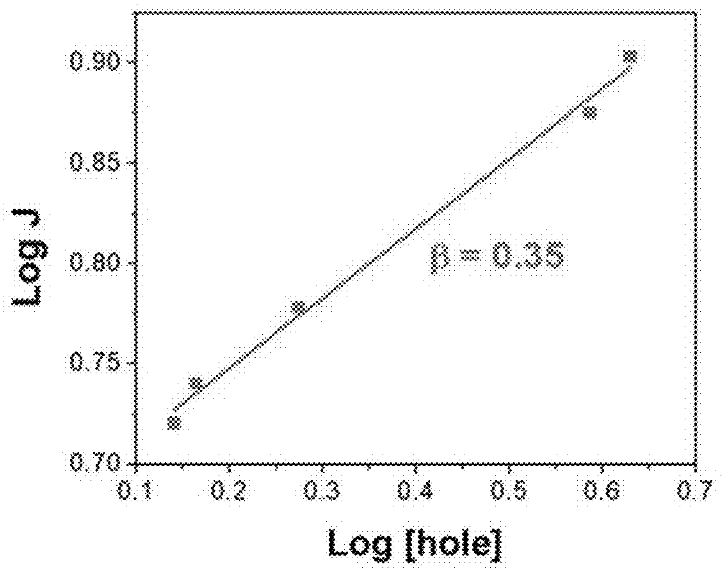
FIG. 2.34

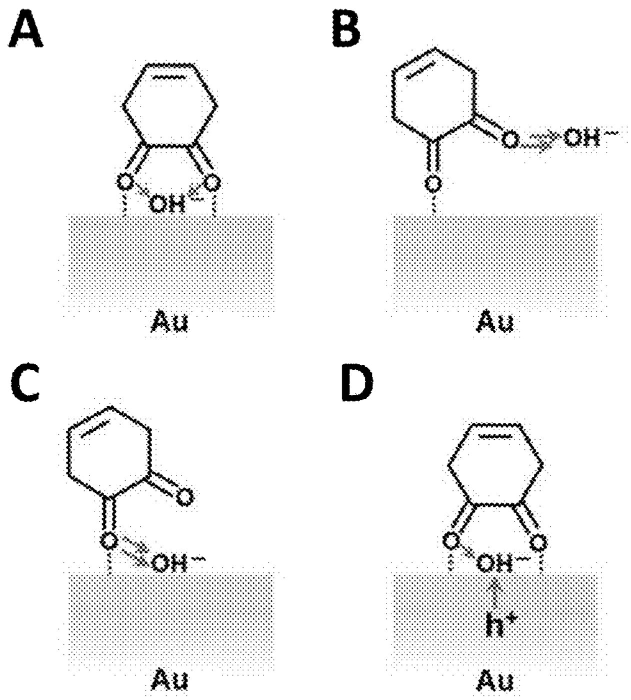
FIG. 2.35
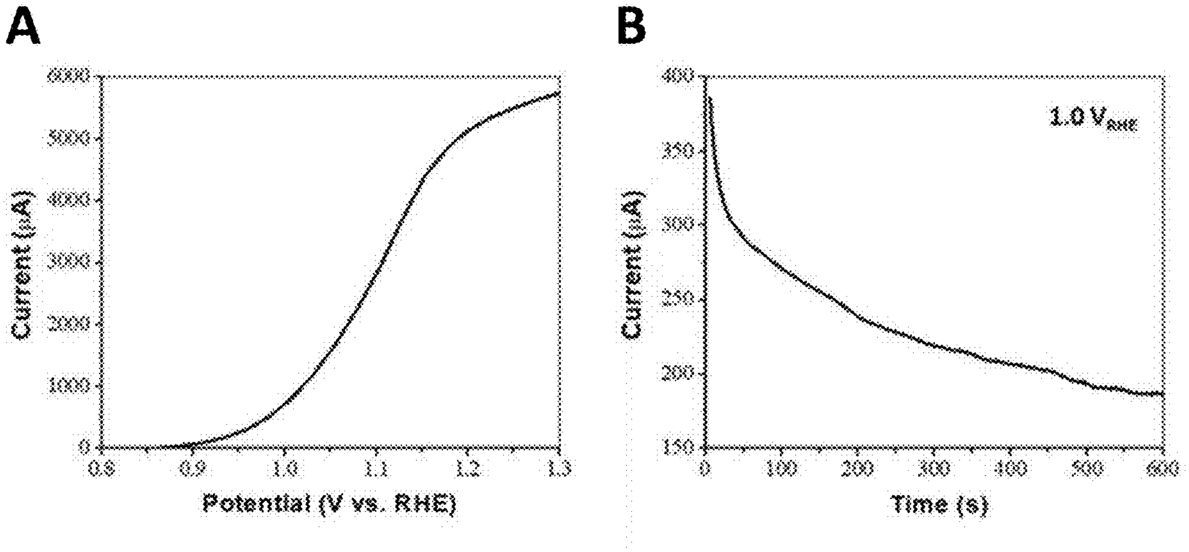
FIG. 2.36

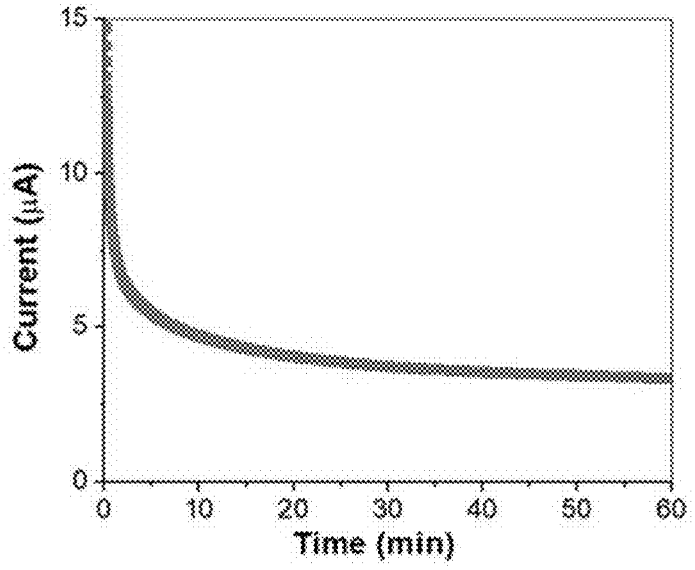
FIG. 2.37
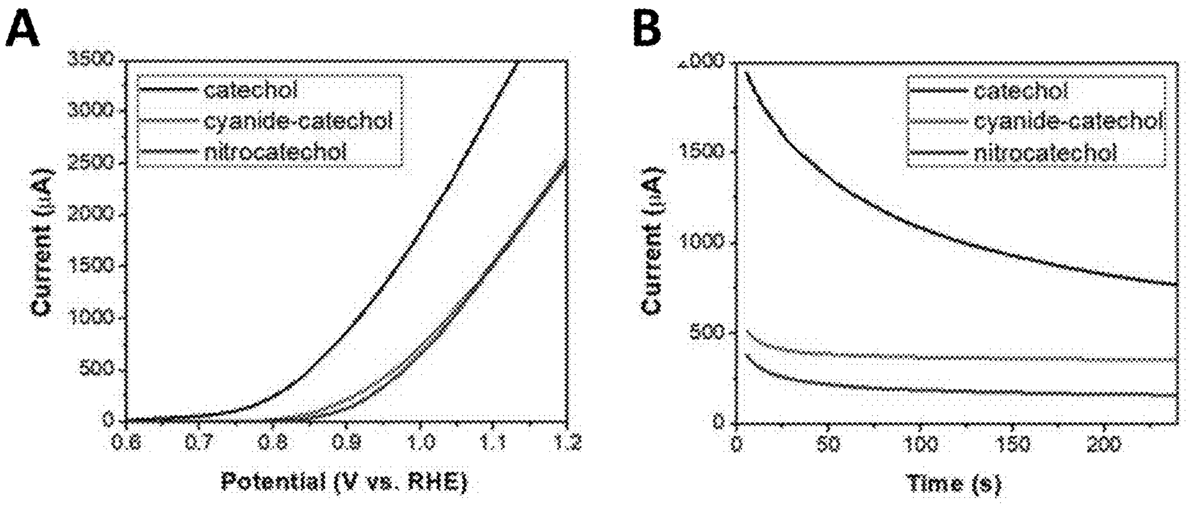
FIG. 2.38

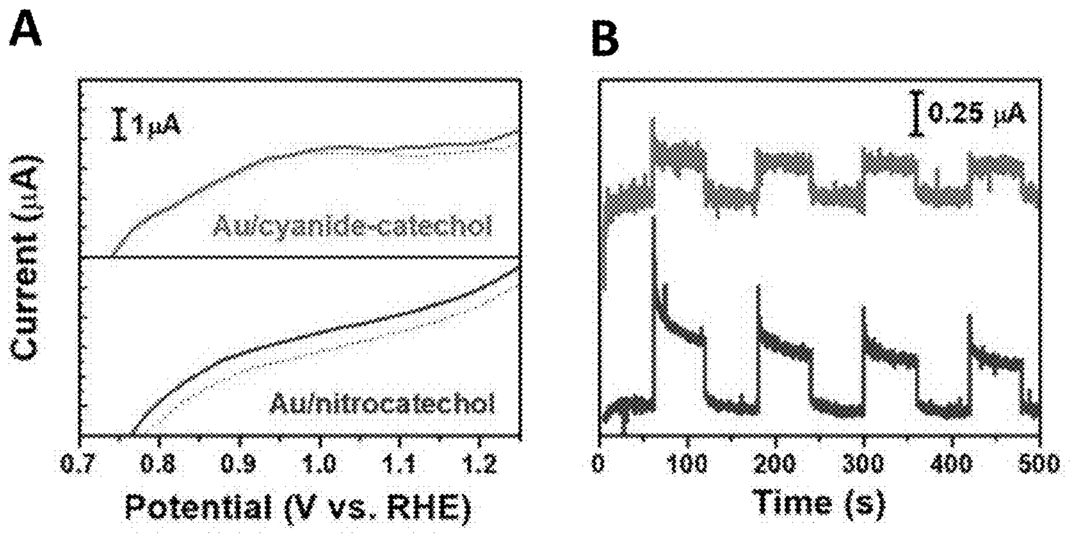
FIG. 2.39
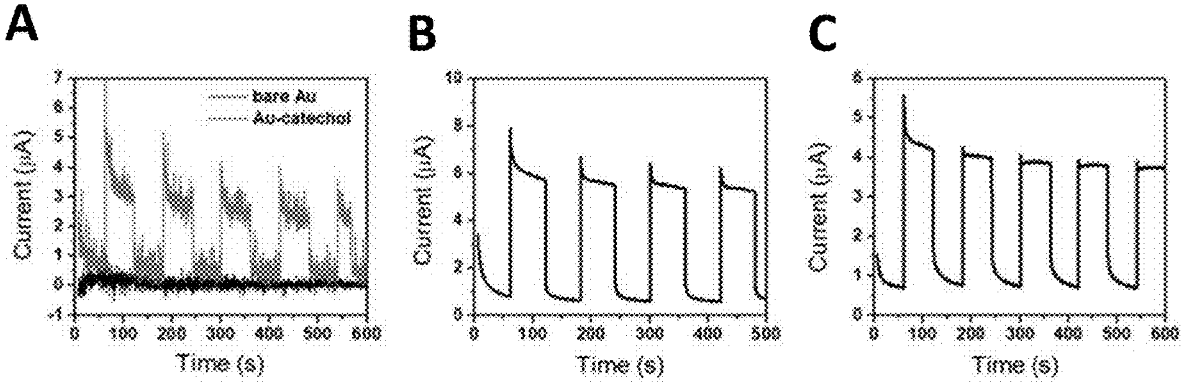
FIG. 2.40
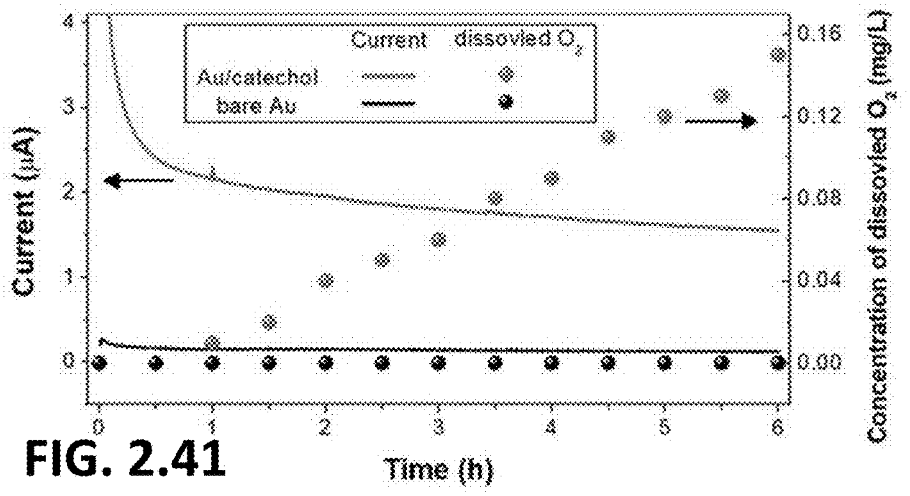
FIG. 2.41

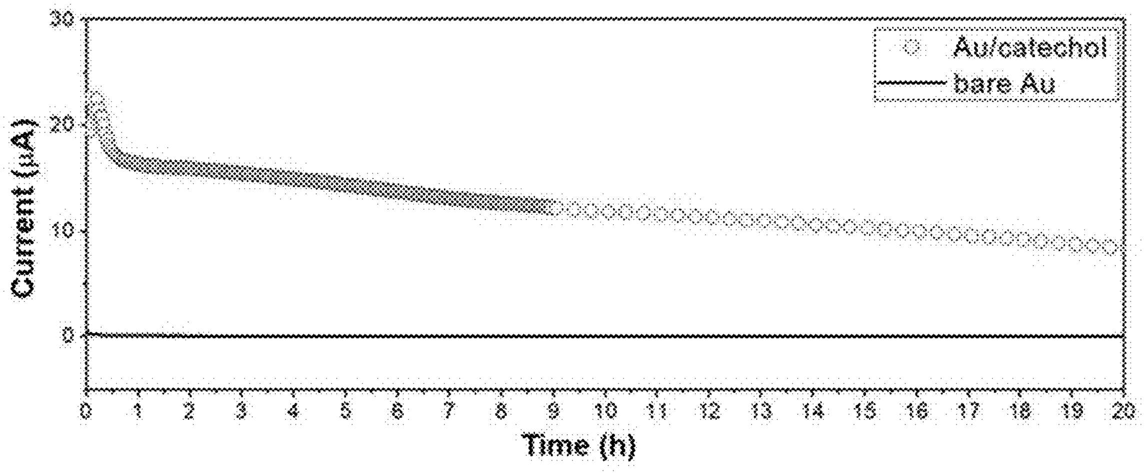
FIG. 2.42
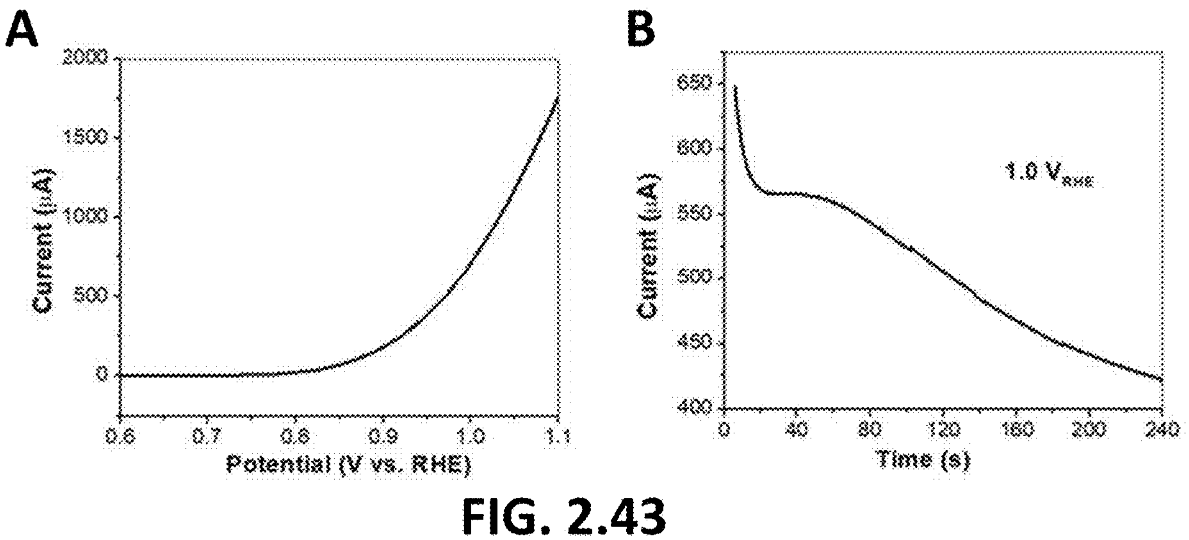
FIG. 2.43

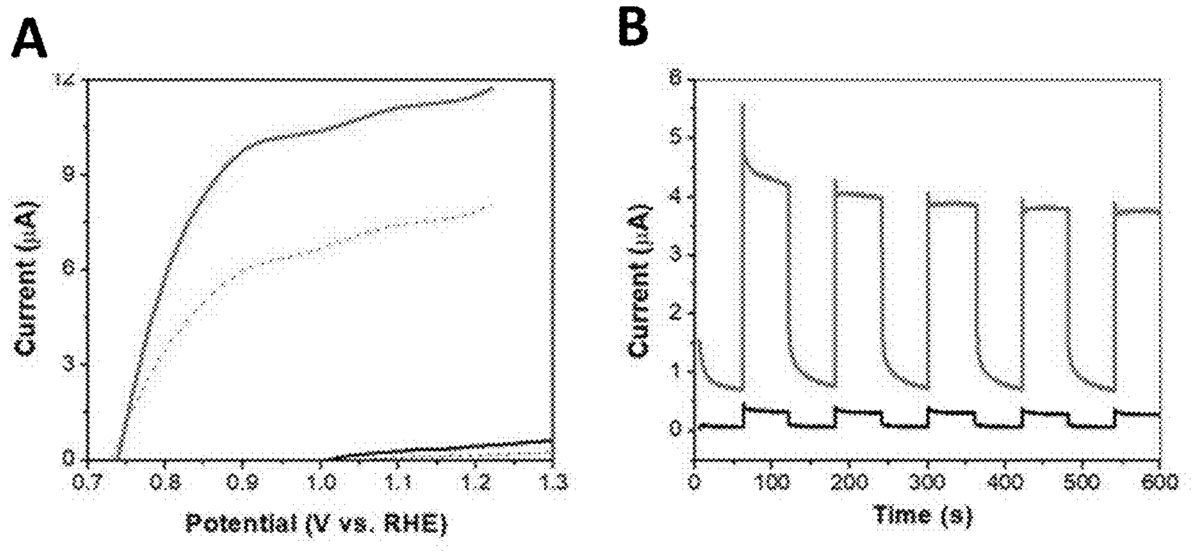
FIG. 2.44
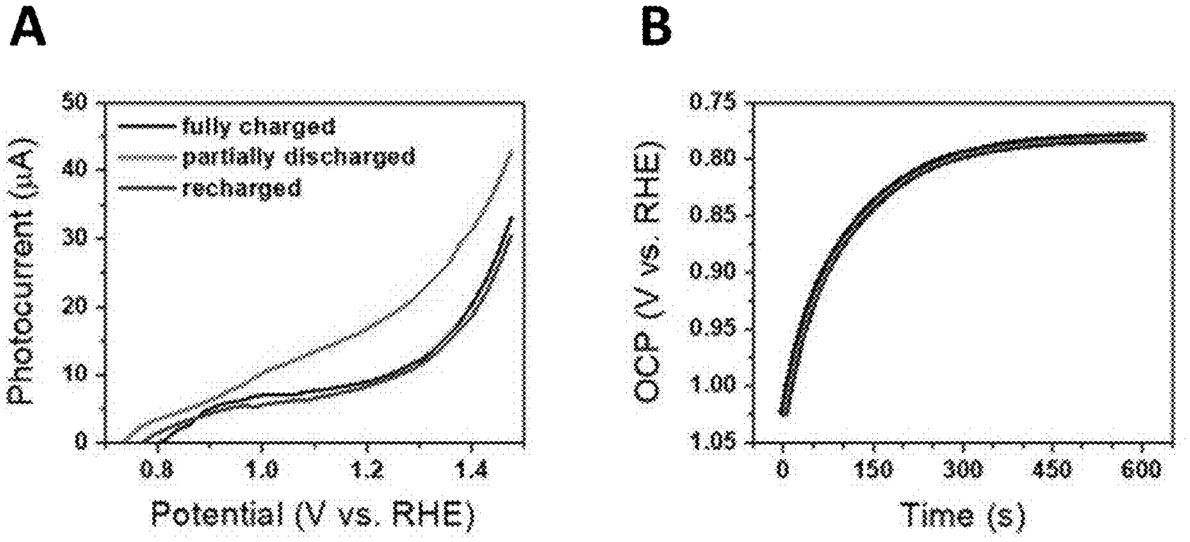
FIG. 2.45

PHOTOCATALYSTS FOR WATER OXIDATION

CLAIM OF PRIORITY TO RELATED APPLICATION

This application is the 35 U.S.C. § 371 national stage of PCT Application No. PCT/US2021/025991, filed on Apr. 6, 2021, wherein the PCT application claims priority to, and the benefit of, U.S. provisional application entitled "PHOTOCATALYSTS FOR WATER OXIDATION" having Ser. No. 63/006,539 filed on Apr. 7, 2020, and U.S. provisional application entitled "PHOTOCATALYSTS FOR WATER OXIDATION" having Ser. No. 63/028,929 filed on May 22, 2020, all of which are herein incorporated by reference in their entireties.

FEDERAL FUNDING

This invention was made with government support under Grant Nos. 1808539 and DMR-1352328, awarded by the National Science Foundation. The government has certain rights in the invention.

BACKGROUND

Photochemical reactions, such as water oxidation and $CO_2$ reduction, involve multiple hole/electron transfer to ultimately generate stable products. Multi-carrier reactions are based on long-lived hot carriers and multiple oxidations/reductions of active sites. Natural photosynthesis utilizes sophisticated redox cascade consisting of enzymes and molecular mediators to trap and transport hot carriers for achieving efficient multiple charge transfer. However, design principles for modulating multiple charge transfer in artificial hot-carrier photochemistry remain undeveloped.

SUMMARY

The present disclosure provides for a composition that includes a modified $M/TiO_2$ composite, method of making the modified $M/TiO_2$ composite, an electrode having modified $M/TiO_2$ composite surface and a photoelectrochemical cell including the electrode, and methods of photoelectrochemical oxidation of water. In an aspect, the modified $M/TiO_2$ composite has a catechol compound(s) (e.g., oligo-catechol) adsorbed onto at least the M (metal) on the surface of the modified $M/TiO_2$ composite. In an aspect, the modified $M/TiO_2$ composite can be a defect-free $M/TiO_2$ interface.

In an aspect, the present disclosure provides for a composition, comprising: a modified $M/TiO_2$ composite having catechol compound adsorbed onto at least the M on the surface of the modified $M/TiO_2$ composite, wherein the modified $M/TiO_2$ composite has a defect-free $M/TiO_2$ interface, and optionally wherein the $M/TiO_2$ composite has the characteristic of having a higher CO oxidation activity than that on the oxygen vacancy (Vo)-rich $M/TiO_2$ interface. The $M/TiO_2$ composite can be selected from: a $Au/TiO_2$ composite, a $Ag/TiO_2$ composite, a $Cu/TiO_2$ composite, a $Pd/TiO_2$ composite, or a $Pt/TiO_2$ composite. The catechol can be an oligo-catechol, for example, that includes 2 to 15 monomers in the backbone of the chain and/or has a molecular weight about 110 to 600 g/mol.

In an aspect, the present disclosure provides for a photochemical cell, comprising: an electrode comprising modified $M/TiO_2$ composite on the surface of the electrode, wherein the modified $M/TiO_2$ composite having catechol compound adsorbed onto at least the M on the surface of the modified $M/TiO_2$ composite.

In an aspect, the present disclosure provides for a method of photoelectrochemical oxidation of water, comprising: exposing, in the presence of light, water to an electrode comprising modified $M/TiO_2$ composite on the surface of the electrode, wherein the modified $M/TiO_2$ composite having catechol compound adsorbed onto at least the M on the surface of the modified $M/TiO_2$ composite; and oxidizing the water to 02 and producing electricity.

In an aspect, the present disclosure provides for a method comprising: photochemically growing metal nanoparticles on the surface of a $TiO_2$ electrode to form a $M/TiO_2$ composite electrode; annealing the $M/TiO_2$ composite electrode to form an annealed $M/TiO_2$ composite electrode; and photoelectrodeposition of catechol monomers in the presence of the annealed $M/TiO_2$ composite electrode to form the modified $M/TiO_2$ composite electrode having catechol compound adsorbed onto at least the M on the surface of the modified $M/TiO_2$ composite electrode.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1 illustrates visible-light-mediated hot-hole transfer on pristine $Au/TiO_2$ heterostructures. FIG. 1.1A illustrates $V_{ph}$ obtained from $TiO_2$ (red) and Au (black) on a dual-working $Au/TiO_2$ electrode in the solution with pH 13.6. The light was turned on at 100 s and off at 400 s. FIG. 1.1B illustrates trapping and releasing time constants of hot holes on $TiO_2$ in the unbuffered solution with pH 7.0 (black) and pH 13.6 (red). Data were calculated from electrochemical impedance spectroscopy (EIS) results measured on $Au/TiO_2$ heterostructures using the electric model (FIG. 2.11). (c) Photocurrent densities (J in $\mu A/cm^2$) over surface-hole densities ([hole] in number of hole/$nm^2$) on $Au/TiO_2$ heterostructures in the unbuffered solution with pH 7.0 (black) and pH 13.6 (red) at 0.5 $V_{RHE}$. The estimation of [hole] was shown in Supplementary note 4. (d) Scheme of transfer and recombination of hot carriers on $Au/TiO_2$ heterostructures.

FIG. 1.1E illustrates Scheme 1 that shows photo-induced multi-hole reaction pathways on MNPs. Scheme (a) illustrates multi-hole accumulation on MNP. Scheme (b) illustrates sequential oxidation pathway. Multi-hole accumulation on the hole-trapping mediator (HTM), which provides active sites for reactions. Scheme (c) illustrates multi-hole cooperation pathway. The hole trapped on HTM cooperates with the subsequently generated hole on MNP to drive reactions at MNP/HTM interfaces, which circumvents the sluggish multi-hole accumulation on a single component. Red bubbles represent hot holes. The incident visible light only excites MNP but not HTM.

FIG. 1.2 illustrates catechol-mediated hot-hole trapping on $Au/TiO_2$ heterostructures. FIG. 1.2A illustrates LSV curves measured from pristine $Au/TiO_2$ heterostructures (black curves) and catechol-modified $Au/TiO_2$ heterostructures (red curves) under visible-light illumination (470 nm LED, solid curves) and in the dark (dashed curves). FIG. 1.2B illustrates OCP obtained from $TiO_2$ on pristine $Au/TiO_2$ heterostructures (black) and catechol-modified $Au/TiO_2$ heterostructures (red). The light was turned on at 10 s and off at 70 s. FIG. 1.2C illustrates a scheme of charge separation and water oxidation on catechol-modified $Au/TiO_2$ heterostructures. FIG. 1.2D illustrates the reaction order of $TiO_2$-trapped holes in driving PEC water oxidation on catechol-modified $Au/TiO_2$ heterostructures. All experiments were performed in the unbuffered solution with pH 7.0.

FIG. 1.3 illustrate the Hot-hole releasing dynamics on catechol-modified Au. FIG. 1.3A illustrates OCP measurements of bare and catechol-modified Au NP electrodes. FIG. 1.3B illustrates OCP measurements immediately after the bare and catechol-modified Au NP electrodes were fully charged under 470 nm illumination at 1.2 $V_{RHE}$. The light was turned off at 600 s. The OCP curves were fitted using the exponential decay equation (see Supplementary Information).

FIG. 1.4 illustrates water oxidation on catechol-modified Au NP electrodes. FIG. 1.4A illustrates LSV curves of bare, catechol-modified, and cyanide-catechol-modified Au NP electrodes under 470 nm illumination (solid curves) and in the dark (dashed curves) in the unbuffered solution with pH 7.0. FIG. 1.4B illustrates the corresponding chronoamperometry measurements at 1.2 $V_{RHE}$ under chopped light illumination with 60 s interval. FIG. 1.4C illustrates a scheme of trapping hot holes on catechol-modified Au NP. Catechol confined hot holes at Au/catechol interfaces and facilitated water oxidation. FIG. 1.4D illustrates a scheme of trapping holes on cyanide-catechol-modified Au NP. In contrast to FIG. 1.4C, cyanide-catechol transferred hot holes away from Au surfaces and blocked water oxidation.

FIG. 1.5 illustrates proposed scheme of multi-hole cooperation pathway for water oxidation on catechol-modified Au surfaces. Red arrows indicated directions of hot-hole transfer. For simplicity, only one catechol molecule was shown to represent oligo-catechol.

FIG. 2.1 illustrates morphologies of $Au/TiO_2$ and Au NP electrodes. FIG. 2.1A illustrates SEM image of $Au/TiO_2$ heterostructures. FIG. 2.1B illustrates ADF-STEM image showing an intimate physical contact between Au and $TiO_2$, which ensured an efficient charge transfer across $Au/TiO_2$ interfaces. FIGS. 2.1C and D illustrate SEM images of a Au NP electrode. FIG. 2.1E illustrates EDS mapping of Au on the same area of FIG. 2.1D. FIG. 2.1F illustrates EDS mapping of Sn on the same area of FIG. 2.1D. EDS mapping was used to reveal sizes and distributions of Au NPs on FTO.

FIG. 2.2 illustrates UV-Vis spectrum of a $Au/TiO_2$ electrode. FTO glass was used as reference. The major visible-light absorption peak located at 550 nm with a weaker absorption around 460 nm. In this work, to photo-excite $Au/TiO_2$, three mono-wavelength LED lamps (470 nm, 530 nm, and 630 nm) were used as light sources with light intensities adjusted to 500 $mW/cm^2$.

FIG. 2.3 illustrates comparison of photovoltage ($V_{ph}$, upper panel) and photocurrent (I-t) under the bias of 1.2 $V_{RHE}$ with chopped light irradiation (lower panel) between a Au NP electrode (red lines) and a $Au/TiO_2$ electrode (black lines). 470 nm, 530 nm, and 630 nm LED lamps were used as irradiation sources with light intensities adjusted to 500 $mW/cm^2$. For the $Au/TiO_2$ electrode, although a higher $V_{ph}$ was observed under 530 nm irradiation due to more intensive light absorption, the 470 nm irradiation generated a much higher photocurrent. It has been known that under 530 nm irradiation, intraband excitation mainly contributed to generation of hot holes within sp band of Au, while the 470 nm irradiation generated hot holes in d band of Au via interband transition.[4-6] Previous reports showed that those d-band holes possessed higher energy than sp-band holes[6] and were thermodynamically energetic enough to oxidize water.[4-5]

FIG. 2.4 illustrates a linear sweep voltammetry (LSV) traces of a $Au/TiO_2$ electrode obtained under different pHs (7.0 and 13.6) and buffer (10 mM phosphate) conditions. The green curve was obtained from a Au NP electrode. The scan rate was 50 mV/s. The light source was a 470 nm LED lamp (500 $mW/cm^2$).

FIG. 2.5 illustrates OCP measurements and data analysis. FIG. 2.5A illustrates OCP measurements of a $Au/TiO_2$ photoanode in the unbuffered solution with pH 7.0 (black) and pH 13.6 (blue) and in the buffered solution with pH 7.0 (red). The light source was a Xenon lamp coupled with a 495 nm long pass filter (300 $mW/cm^2$). The light was turned off at 8 s. FIG. 2.1B illustrates calculated average lifetimes of photo-generated carriers from OCP decays. FIG. 2.1C illustrates fitted curves of OCP decays using the exponential equation.

FIG. 2.6 illustrates characterizations and the structure of dual-working $Au/TiO_2$ electrodes. FIG. 2.6A illustrates LSV traces under pH 13.6 (scan rate 50 mV/s) and FIG. 2.6B illustrates UV-vis spectra of a pristine $Au/TiO_2$ electrode (black), a dual-working $Au/TiO_2$ electrode (Au film/Au/$TiO_2$, red) and $TiO_2$—Au film without Au NPs (Au film/$TiO_2$, blue). The light source was a 470 nm LED lamp (500 $mW/cm^2$). FIG. 2.6C illustrates SEM images of the dual-working $Au/TiO_2$ electrode. FIG. 2.6D illustrates a scheme of the dual-working $Au/TiO_2$ electrode. Au NPs and the Au film were considered as a whole component for photo excitation. As a result, Schottky barrier was formed between $TiO_2$ and the whole Au component rather than Au NPs alone. The insulation block was an epoxy resin layer. The $TiO_2$—Au film electrode without Au NPs showed no PEC activity. It might be the Au NP of the Au film is too small and electron transfer at interfaces is not efficient.

FIG. 2.7 illustrates a comparison of LSV traces between front-illumination and back-illumination on a dual-working $Au/TiO_2$ electrode. The light source was a 470 nm LED lamp (500 $mW/cm^2$). The scan rate was 50 mV/s.

FIG. 2.8 illustrates $V_p$h on a dual-working $Au/TiO_2$ electrode: data obtained from $TiO_2$ (red) and Au (black). Experiments were performed under three solution conditions (unbuffered pH 7.0, buffered pH 7.0, and pH 13.6) using three light sources (470 nm, 530 nm, and 630 nm LED lamps) with light intensities adjusted to 500 $mW/cm^2$. The OCP of Au was manually shifted to align the dark OCP of Au with that of $TiO_2$ for comparison.

FIG. 2.9 illustrates in situ OCP measurements during LSV on a dual-working $Au/TiO_2$ electrode. FIG. 2.9A illustrates LSV measurements were performed on $TiO_2$ and FIG. 2.9B illustrates OCP of Au was monitored simultaneously. FIG. 2.9C illustrates LSV measurements were performed on Au and FIG. 2.9D illustrates OCP of $TiO_2$ was monitored simultaneously. The scan rate was 1 mV/s. The light source was a 470 nm LED lamp (500 $mW/cm^2$).

FIG. 2.10 illustrates the isotope effect of $V_{ph}$ obtained from a dual-working $Au/TiO_2$ electrode in the unbuffered solution with pH 7.0: data obtained from (FIG. 2.10A) $TiO_2$ and (FIG. 2.106) Au. The light was turned on at 100 s and off at 300 s.

FIG. 2.11 illustrates a representative Nyquist plot obtained from the EIS measurement of a $Au/TiO_2$ electrode at 0.5 $V_{RHE}$ under pH 13.6. Inset was the model circuit used for fitting and simulation.

FIG. 2.12 illustrates the calculated EIS parameters under various irradiations. $C_{trap}$ and $R_{ct,trap}$ calculated from the fitting and simulation of EIS data obtained under various applied potentials in the solution with pH 13.6 with three irradiation wavelengths: (FIG. 2.12A) 470 nm; (FIG. 2.12B) 530 nm; (FIG. 2.12C) 630 nm.

FIG. 2.13 illustrates the calculated EIS parameters in various electrolytes. FIG. 2.12A illustrates $C_{trap}$ and FIG. 2.12B illustrates time constants of charging and discharging of surface states calculated from the fitting and simulation of EIS spectra. All experiments were performed using a 470 nm LED lamp (500 mW/cm$^2$).

FIG. 2.14 illustrates rate law analysis of PEC water oxidation on Au/$TiO_2$ in the unbuffered solution with pH 7.0. FIG. 2.14A illustrates the LSV trace. Relationship between photocurrent densities and surface hole densities of a Au/$TiO_2$ photoanode at (FIG. 2.14B) 0.5 $V_{RHE}$ and (FIG. 2.14C) 0.7 $V_{RHE}$.

FIG. 2.15 illustrates the rate law analysis of PEC water oxidation on Au/$TiO_2$ under pH 13.6. FIG. 2.15A illustrates the LSV trace. Relationship between photocurrent densities and surface hole densities of a Au/$TiO_2$ photoanode at (FIG. 2.15B) 0.5 $V_{RHE}$ and (FIG. 2.15C) 0.7 $V_{RHE}$.

FIG. 2.16 illustrates the rate law analysis of oxidation of $Na_2SO_3$ on Au/$TiO_2$ under pH 13.6. FIG. 2.16A illustrates the LSV trace. FIG. 2.16B illustrates the relationship between photocurrent densities and surface hole densities of a Au/$TiO_2$ photoanode at 1.3 $V_{RHE}$; 1.3 $V_{RHE}$ was used to ensure efficient oxidation of $Na_2SO_3$. $Na_2SO_3$ was used as a hole scavenger to diminish the barrier of surface chemical reactions and leave only hole-trapping steps in RDS. It was observed that $Na_2SO_3$ decreased the reaction order from ~4 to ~2, confirming the formation of two adjacent trapped holes in RDS under alkaline conditions.

FIG. 2.17 illustrates a scheme of hole transfer and water oxidation on Au/$TiO_2$ heterostructures under (FIG. 2.17A) neutral and (FIG. 2.17B) alkaline conditions. Red arrows represent hole transfer in RDS. Surface-trapped holes were proposed to be stored in terminal oxygens in the form of Ti—O.. In previous studies, both terminal and the bridging oxygens were proposed to be active sites for trapping photo-generated holes on $TiO_2$.[16-19]However, as the bridging oxygen exhibited much higher acidity ($pK_a$ below 0) than the terminal oxygen ($pK_a$~9) on rutile $TiO_2$ surfaces,[20] the deprotonation process should be absent on Ti—O—Ti and Ti—O—Au structures under pH 7.0-13.6 conditions. Therefore, the terminal oxygen (—Ti—OH) was more likely to be the hole-trapping site that accounted for the observed isotopic effect in FIG. 2.10.

FIG. 2.18 illustrates the H/D kinetic isotope effect (KIE) measurement on a Au/$TiO_2$ photoanode under pH/pD 7.0. The experiments were performed under the irradiation using an Xe lamp coupled with a 495 nm long pass filter.

FIG. 2.19 illustrates the photocurrent on a dual-working Au/$TiO_2$ electrode with constant potentials on $TiO_2$ (black lines) and Au (red lines) in solutions with: (FIG. 2.19A and B) pH 13.6, (FIGS. 2.19C and D) pH 7.0 (buffered), and (FIGS. 2.19E and F) pH 7.0 (unbuffered). The applied potential on $TiO_2$ was 0.8 $V_{RHE}$, while applied potentials on Au were 0.8 $V_{RHE}$ (FIGS. 2.19A, C and E) and 1.0 $V_{RHE}$ (FIGS. 2.19B, D, and F). The light source was a 470 nm LED lamp (500 mW/cm$^2$). The light was turned on at 30 s and off at 90 s.

FIG. 2.20 illustrates photocurrent on a dual-working Au/$TiO_2$ electrode with a potential of 0.8 $V_{RHE}$ on $TiO_2$ while leaving Au under open-circuit conditions (pH 13.6). The light source was a 470 nm LED lamp (500 mW/cm$^2$). The light was turned on at 30 s and off at 90 s.

FIG. 2.21 illustrates photocurrent on a $TiO_2$—Au film electrode without Au NPs. A constant potential (0.8$V_{RHE}$) was applied on both $TiO_2$ and Au in the solution with pH 13.6. The light source was a 470 nm LED lamp (500 mW/cm$^2$). The light was turned on at 60 s and off at 92 s.

FIG. 2.22 illustrate photocurrent on a dual-working Au/$TiO_2$ electrode. A constant potential (0.8 $V_{RHE}$) was applied on $TiO_2$ (black lines) and Au (red lines) in the solution with pH 13.6. The irradiations were (a) 530 nm LED lamp and (b) 630 nm LED lamp (500 mW/cm$^2$). The light was turned on at 30 s and off at 90 s.

FIG. 2.23 illustrates photoelectrodeposition of catechol on a Au/$TiO_2$ electrode. FIG. 2.23A illustrates LSV measurement of a Au/$TiO_2$ electrode in the solution containing catechol (0.1 M). FIG. 2.23B illustrates chronoamperometry performed at 1.0 $V_{RHE}$ for 240 s. The light source was a 470 nm LED lamp (500 mW/cm$^2$).

FIG. 2.24 illustrates charging of the catechol-modified Au/$TiO_2$ electrode. A constant potential of 1.2 $V_{RHE}$ was held on the catechol-modified Au/$TiO_2$ electrode under 470 nm irradiation (500 mW/cm$^2$) for 1 h to fully charge the electrode with hot holes. The photocurrent eventually reached a plateau, indicating that all hydroxyl groups were oxidized to ketone groups.

FIG. 2.25 illustrates photo deposition of catechol on a Au/$TiO_2$ electrode. FIG. 2.25A illustrates OCP measurement of a Au/$TiO_2$ electrode in the solution containing catechol (0.1 M) under 470 nm irradiation for 10 h. FIG. 2.23B illustrates LSV measurements on the pristine and catechol-modified Au/$TiO_2$ electrodes. The light source was a 470 nm LED lamp (500 mW/cm$^2$).

FIG. 2.26 illustrates molecular structures of oligo-catechol. The appearance of (FIG. 2.26A) m/z-2 species (m/z 216 compared with m/z 218 in Table S5) demonstrated that (FIG. 2.26B) catechol dimer further trapped hot holes via a one-hole process of oxidizing hydroxyl groups (—C—OH) to ketone groups (—C═O). The stable semiquinone species (m/z=216) also indicated that the semiquinone possessed low oxidative capability that was hard to fully release trapped holes to return to the original state of catechol. It is noted that the LC-MS experiment was an ex situ technique. In fact, it has been previously reported that the redox process among quinone, semiquinone and hydroquinone functioned to trap and release holes in photocatalysis.[25] Observation of semiquinone was achieved by EPR studies.[25]

FIG. 2.27 illustrates chronoamperometry performed on the pristine Au/$TiO_2$ electrode (black) and catechol-modified Au/$TiO_2$ electrode (red) at 1.2 $V_{RHE}$ under chopped-light irradiation. The light source was a 470 nm LED lamp (500 mW/cm$^2$). The pristine Au/$TiO_2$ electrode generated a steady photocurrent of 39 μA while the catechol-modified Au/$TiO_2$ electrode generated a steady photocurrent of 73 μA. Therefore, the enhancement factor was (73-39)/39=87%.

FIG. 2.28 illustrates the reproducibility of catechol-mediated photocurrent enhancement. The catechol modification and the relevant PEC measurements were repeated for several times and here we show three representative cases. The activity enhancement caused by catechol modification depends on the original activity of Au/$TiO_2$ electrodes. When the activity of bare Au/$TiO_2$ electrodes is high (FIG. 2.28A), it showed relatively low enhancement factor (from 103 μA to 147 μA, enhanced by 43%). FIG. 2.28B (i.e., FIG. 1.2A) showed the moderate activity of bare Au/$TiO_2$ electrode and accordingly the moderate enhancement factor (from 47 μA to 84 μA, enhanced by 80%). Figure c showed the lowest activity of bare Au/$TiO_2$ electrode but the highest enhancement factor (from 12 μA to 34 μA, enhanced by 183%).

FIG. 2.29 illustrates OCP curves obtained from (FIG. 2.29A) $TiO_2$ and (FIG. 2.29B) Au on a dual-working Au/$TiO_2$ electrode: pristine (black) and catechol-modified (red) Au/$TiO_2$ heterostructures. The light source was a 470 nm LED lamp (500 mW/$cm^2$). The light was turned on at 10 s and off at 70 s.

FIG. 2.30 illustrates Au 4f XPS spectra of a bare Au NP electrode, a pristine Au/$TiO_2$ electrode, and a catechol-modified Au/$TiO_2$ electrode.

FIG. 2.31 illustrates EIS on pristine (black) and catechol-modified (red) Au/$TiO_2$ electrodes at 0.8 $V_{RHE}$ under 470 nm illumination (500 mW/$cm^2$) in the unbuffered solution with pH 7.0. The capacitance of $TiO_2$-trapped holes ($C_{trap}$) decreased from 38.2 μF to 22.9 μF after the modification of catechol.

FIG. 2.32 illustrates photoelectrodeposition of catechol on a bare $TiO_2$ electrode. FIG. 2.32A illustrates LSV measurement of a $TiO_2$ electrode in the solution containing catechol (0.1 M). FIG. 2.32B illustrates chronoamperometry performed at 1.0 $V_{RHE}$ for 240 s. The light source was a 470 nm LED lamp (500 mW/$cm^2$).

FIG. 2.33 illustrates PEC behavior of the catechol-modified $TiO_2$ electrode. Data obtained from bare (black) and catechol-modified (red) $TiO_2$ electrodes. (FIG. 2.33A) LSV measurements under 470 nm illumination (solid lines) and in the dark (dashed lines). (FIG. 2.33B) OCP measurements under 470 nm illumination with the light turned on at 30 s and off at 90 s.

FIG. 2.34 illustrates a reproduced result of the reaction order measurement on catechol-modified Au/$TiO_2$ electrodes. A new catechol-modified Au/$TiO_2$ electrode (different from the one used in the main text) was used and a similar reaction order was obtained.

FIG. 2.35 illustrates multi-hole reaction pathways on catechol-modified Au surfaces. FIG. 2.35A illustrates the cooperation of two C=0 unities provided two holes for driving water oxidation. FIG. 2.35B illustrates water oxidation occurred via sequential oxidations of one hydroxyl group that was spatially away from Au surfaces. Two arrows indicated sequential hole transfers. FIG. 2.35C illustrates water oxidation occurred via sequential oxidations of one hydroxyl group that adsorbed on Au surfaces. Two arrows indicated sequential hole transfers. FIG. 2.351D illustrates the cooperation between one hole initially trapped on catechol and one hole newly generated on Au.

FIG. 2.36 illustrates photoelectrodeposition of catechol on a Au NP electrode. FIG. 2.36A illustrates LSV measurement of a Au NP electrode in the solution containing catechol (0.1 M). FIG. 2.2B illustrates chronoamperometry performed at 1.0 $V_{RHE}$ for 600 s. The light source was a 470 nm LED lamp (500 mW/$cm^2$).

FIG. 2.37 illustrates charging of the catechol-modified Au NP electrode. A constant potential of 1.2 $V_{RHE}$ was held on the Au/catechol electrode under 470 nm irradiation (500 mW/$cm^2$) for 1 h to fully charge the electrode with hot holes. The photocurrent reached a plateau, indicating that all hydroxyl groups were oxidized to ketone groups.

FIG. 2.38 illustrates fabrication of catechol derivative-modified Au NP electrodes. FIG. 2.38A illustrates LSV measurements on Au NP electrodes in solutions containing catechol, cyanide-catechol, and 4-nitrocatechol, respectively. FIG. 2.38B illustrates chronoamperometry performed at 1.0 $V_{RHE}$ for 240 s. The light source was a 470 nm LED lamp (500 mW/$cm^2$).

FIG. 2.39 illustrates comparison between 4-nitrocatechol-modified and cyanide-catechol-modified Au NP electrodes. FIG. 2.39A illustrates LSV traces and FIG. 2.39B illustrates chronoamperometry curves under 1.2 $V_{RHE}$ with chopped light irradiation between Au/cyanide-catechol (red lines) and Au/4-nitrocatechol (blue lines) electrodes. The light source was a 470 nm LED lamp (500 mW/$cm^2$).

FIG. 2.40 illustrates the reproducibility of catechol-mediated photocurrent enhancement on Au NP electrodes. The PEC water-oxidation activity of bare Au NP electrodes exhibited a highly reproducible value of ~0.2 μA. Hence, we only compare those catechol-modified electrodes in this case, without considering the minor difference among bare Au NP electrodes. This experiment was repeated for three times. Photocurrent results of 2.5 μA, 5.3 μA and 3.3 μA were obtained. The average value was 3.7 μA and the error was 1.2 μA.

FIG. 2.41 illustrates $O_2$ evolution test. A constant bias of 1.2 $V_{RHE}$ was applied on bare and catechol-modified Au NP electrodes for 6 h. Solid lines showed the photocurrent during $O_2$ detection. Stable photocurrent of ~2 μA within 6 h was obtained on the Au/catechol electrode. The amount of produced $O_2$ was detected using a dissolved oxygen meter. Dots represented concentrations of dissolved $O_2$. The light source was a 470 nm LED lamp (500 mW/$cm^2$).

FIG. 2.42 illustrates long-term stability of a Au/catechol electrode. Photo electrolysis performed on a Au/catechol electrode for 20 h at 1.2 $V_{RHE}$. The light source was a 470 nm LED lamp (500 mW/$cm^2$). Data was collected every 2 min before 9 hours and every 20 min afterward.

FIG. 2.43 illustrates photoelectrodeposition of catechol on an FTO electrode. FIG. 2.43A illustrates LSV measurement of an FTO electrode in the solution containing catechol (0.1 M). FIG. 2.43B illustrates chronoamperometry performed at 1.0 $V_{RHE}$ for 240 s. The light source was a 470 nm LED lamp (500 mW/$cm^2$).

FIG. 2.44 illustrates PEC behaviors of the catechol-modified FTO electrode and the catechol-modified Au electrode. Data obtained from the catechol-modified FTO electrode (black) and the catechol-modified Au NP electrode (red). FIG. 2.44A illustrates LSV measurements under 470 nm illumination (solid curves) and in the dark (dashed curves). FIG. 2.44B illustrates chronoamperometry measurements under chopped 470 nm illumination at 1.2 $V_{RHE}$.

FIG. 2.45A illustrates recovery of potential-photocurrent curves after turning bias off. FIG. 2.45B illustrates OCP measurement for detecting the recovery process. In FIG. 2.45A, the fully charged curve refers to that electrode was kept under the bias of 1.2 $V_{RHE}$ for 6 h, in which all catechol molecules were converted to quinone. After turning of the bias for 600 s (the change of OCP was monitored as shown in FIG. 2.45B, part of quinone molecules released trapped holes and converted to hydroquinone, i.e., the partially discharged curve in FIG. 2.45A. After being recharged under the bias of 1.2 $V_{RHE}$, the I-V curve recovered to the first fully charged state (FIG. 2.45A).

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, mechanical engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DISCUSSION

The present disclosure provides for a composition that includes a modified $M/TiO_2$ composite, method of making the modified $M/TiO_2$ composite, an electrode having modified $M/TiO_2$ composite surface and a photoelectrochemical cell including the electrode, and methods of photoelectrochemical oxidation of water. The modified $M/TiO_2$ composite has a catechol compound(s) (e.g., oligo-catechol) adsorbed onto at least the M (metal) on the surface of the modified $M/TiO_2$ composite. The modified $M/TiO_2$ composite has a defect-free $M/TiO_2$ interface. The modified $M/TiO_2$ composite can be used in an electrode configuration, for example, in a photoelectrochemical cell for the photoelectrochemical oxidation of water.

In an aspect, photoelectrodeposited catechol molecules on $Au/TiO_2$ heterostructures can trap and stabilize photo-generated hot holes on Au and further introduce a new multi-hole reaction pathway in which those long-lived catechol-trapped holes cooperate with newly generated holes on Au. The new mechanism boosts photoelectrochemical water oxidation on Au by one order of magnitude.

In the modified $M/TiO_2$ composite the M can be Au, Ag, Al, Cu, Pt, or Pd. The $M/TiO_2$ composite has a characteristic of having a higher CO oxidation activity than that on the oxygen vacancy (Vo)-rich $M/TiO_2$ interface (without catechol). The $M/TiO_2$ composite has a characteristic of having a higher CO oxidation activity than that on the oxygen vacancy (Vo)-rich $M/TiO_2$ interface. In particular, the $M/TiO_2$ composite has a characteristic of having a higher (e.g., at least 10 times, at least 15 times, at least 20 times, at least 25 times, at least 30 times, or at least 34 times) CO oxidation activity than that on the oxygen vacancy (Vo)-rich $Au/TiO_2$ interface. When the $M/TiO_2$ composite is a $Au/TiO_2$ composite, the $Au/TiO_2$ composite has a characteristic of having a higher (e.g., at least 10 times, at least 15 times, at least 20 times, at least 25 times, at least 30 times, or at least 34 times) CO oxidation activity than that on the oxygen vacancy (Vo)-rich $Au/TiO_2$ interface.

The catechol compounds are adsorbed (e.g., physisorption and/or chemisorption) to the surface of the $M/TiO_2$, in particular adsorbed to M. The catechol compounds can be an oligo-catechol that can include 2 to 15 or 2 to 5 monomers in the backbone of the chain. The oligo-catechol can have a molecular weight about 110 to 600 g/mol. As an example, FIG. 2.26 illustrates two oligo-catechol compounds and other compounds that are oligo-catechol compounds include catechin, dopamine, and the like.

Although generally described here, additional details are provided in Example 1 regarding the method of making the modified $M/TiO_2$ composite. In general, the process for forming the modified $M/TiO_2$ composite on an electrode includes photochemically growing metal nanoparticles on the surface of a $TiO_2$ electrode to form a $M/TiO_2$ composite electrode. Subsequently, the $M/TiO_2$ composite electrode is annealed to form an annealed $M/TiO_2$ composite electrode. The catechol monomers are then photoelectrodeposited onto the annealed $M/TiO_2$ composite electrode to form the modified $M/TiO_2$ composite electrode having catechol compound adsorbed onto at least the M on the surface of the modified $M/TiO_2$ composite electrode.

The present disclosure also includes a photochemical cell including the electrode comprising modified $M/TiO_2$ composite on the surface of the electrode as well as one or more other electrodes used to perform the desired photochemical reaction. For example, the photoelectrochemical oxidation of water can be performed using the photochemical cell of the present disclosure. In particular, the method includes exposing, in the presence of light (e.g., natural or artificial light source (e.g., LED light source)), water to an electrode comprising modified $M/TiO_2$ composite on the surface of the electrode and oxidizing the water to $O_2$ and producing proton. Additional details regarding this process are provided in Example 1.

The present disclosure provides for electrochemical cells that include the composition that includes a modified $M/TiO_2$ composite to oxidize water on the anode to produce $O_2$ and a proton.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Numerous widely-tracked photochemical reactions, such as water oxidation and $CO_2$ reduction, involve multiple hole/electron transfer to ultimately generate stable products.[1-6] Multi-carrier reactions are based on long-lived hot carriers and multiple oxidations/reductions of active sites.[3-4,6] Natural photosynthesis utilizes sophisticated redox cascade consisting of enzymes and molecular mediators (e.g., quinone)' to trap and transport hot carriers for achieving efficient multiple charge transfer. However, design principles for modulating multiple charge transfer in artificial hot-carrier photochemistry remain undeveloped.

Metal nanoparticle photocatalysts (MNPs, e.g., Au and Ag) boast broadly tunable optical properties coupled with catalytically active sites that offer unique opportunities for visible-light photocatalysis.[8-26] The direct interband transition and nonradiative decay of surface plasmon resonance on MNPs generate hot electron-hole pairs that are promising for trigging photochemical reactions.[8-26] However, lifetimes of those hot carriers are extremely short (~fs to ns)[8, 10-11] when compared to the slow kinetics of multi-carrier reactions (~ms to s).[3, 6, 9, 12, 24, 27-31] Numerous studies have used metal/semiconductor heterostructures to prolong lifetimes of hot electrons, thus improving low photocatalytic activities of reduction reactions.[32-34] Nonetheless, to date, very few works have been reported to manipulate photo-generated hot holes for extending their lifetimes to coincide with kinetically sluggish oxidation reactions.' It is noteworthy that photo-generated holes possess faster relaxation dynamics and lower mobility than electrons,[36-37] making it more difficult to trap and utilize them to promote the overall photochemical reaction efficiency.

Long-lived hot holes lay the foundation for triggering multi-hole reactions. Directly trapping and stabilizing multiple hot holes on MNP for driving reactions (Scheme 1a) is difficult due to extremely short lifetimes of hot holes[9, 11-12] and the high energy barrier of multi-hole accumulation.[12, 30-31] A hole-trapping mediator (HTM) then is necessary for extending lifetimes of hot holes and initiating multi-hole reactions. For instance, sequential oxidations of HTM have been reported in dye-sensitized photoelectrochemical cells.[3] Similar multi-hole reaction pathway could also exist on MNP, in which the first trapped hole encounters the second trapped hole to enable a two-hole rate-determining step (RDS) solely taking place on HTM (Sequential oxidation pathway, Scheme 1b). Alternatively, HTM-stored hot holes would cooperate with newly-generated hot holes on MNP to drive the two-hole RDS at MNP/HTM interfaces (Multi-hole cooperation pathway, Scheme 1c).

In this work, we reported that photoelectrodeposited catechol on $Au/TiO_2$ heterostructures stabilized photo-generated hot holes on Au under visible-light illumination and triggered a multi-hole cooperation pathway for prompting water oxidation, a typical sluggish proton-coupled four-hole reaction. Our results showed that on pristine $Au/TiO_2$ heterostructures, photo-generated hot holes were transferred from Au to $TiO_2$ for driving multi-hole reactions via the sequential pathway, but the recombination of those hot holes with hot electrons also transferred to $TiO_2$ severely limited the photoactivity. However, catechol molecules adsorbed on $Au/TiO_2$ heterostructures trapped and stabilized hot holes directly on Au and physically separated them from transferred hot electrons on $TiO_2$. It was further demonstrated that catechol-trapped holes coupled with those newly generated holes on Au to trigger a cooperation pathway for driving water oxidation at Au/catechol interfaces. The new mechanism was found to boost photoelectrochemical water oxidation on Au by one order of magnitude.

Results and Discussion $Au/TiO_2$ heterostructures were constructed by photodepositing Au nanoparticles (NPs) on $TiO_2$ electrodes (see the experimental section in supplementary information and FIGS. 2.1 to S4). Measuring open-circuit potentials (OCPs) in a photoelectrochemical (PEC) water-oxidation cell would identify long-lived hot holes on $Au/TiO_2$ heterostructures as the generation of open-circuit photovoltage ($V_{ph}=V_{light}-V_{dark}$) is known to arise from the accumulation of surface holes when electrodes consist of n-type semiconductors.[38] Indeed, $Au/TiO_2$ heterostructures exhibited $V_{ph}$ of 0.2-0.4 V under visible-light excitation (Supplementary Note 1, Table S1, FIGS. 2.3 and 2.5), indicating that hot holes were accumulated on $Au/TiO_2$ heterostructure surfaces with extended lifetimes. To further pinpoint the exact physical location of trapped hot holes on $Au/TiO_2$ heterostructures, dual-working electrodes were used to measure the separated $V_{ph}$ on Au and $TiO_2$ (Supplementary note 2 and FIGS. 2.6 to 2.9). It was found that $TiO_2$ exhibited a twice larger $V_{ph}$ (~0.4 V) than that on Au (~0.2 V) (FIG. 1.1A and FIG. 2.8), strongly suggesting that transferred hot holes were accumulated on $TiO_2$. Further isotope effect on $V_{ph}$ demonstrated that photo-generated hot holes were transferred from Au to $TiO_2$ via a proton-coupled process (FIG. 2.10), which is known to have slow dynamics.[39-49] $TiO_2$-trapped holes were found to be released in the timescale of second (0.2-1.8 s, FIG. 1.1B, Supplementary Note 3, FIGS. 2.11 to 2.13, and Table S2 and S3), showing that lifetimes of hot holes were extended via being trapped on $TiO_2$. In the unbuffered solution with pH 7.0, time constants remained unchanged with increasing potentials; while for pH 13.6, under the potential above 0.7 $V_{RHE}$ time constants were found to increase as a function of the applied potential, implying that lifetimes of surface-trapped holes were further extended under alkaline conditions owing to circumventing the kinetically sluggish proton-coupled process.[41]

Long-lived holes provide opportunities to enable multi-hole reactions such as water oxidation.[2] The reaction order for $TiO_2$-trapped holes in PEC water oxidation was measured to identify multi-hole reaction pathways (Supplementary Note 4, FIGS. 2.14 to 2.17 and Table S4). FIG. 1.1C showed a reaction order of ~2 under the neutral condition (pH 7.0, black) and a reaction order of ~4 under the alkaline condition (pH 13.6, red), suggesting that two holes were involved in RDS of PEC water oxidation under pH 7.0 while four holes were involved under pH 13.6. This pH dependence is a typical characteristic of proton-coupled hole transfer in multi-hole reactions.[39] Under neutral conditions, $TiO_2$ surfaces were protonated and the slow dynamics of proton-coupled hole transfer only led to isolated surface-trapped holes (not adjacent trapped holes, FIG. 2.17*a*) that underwent multiple sequential oxidations.[2] However, under alkaline conditions, the deprotonation of $TiO_2$ surfaces facilitated the transfer of hot holes and further-extended lifetimes of hot holes (FIG. 1.1B) made it possible to generate two adjacent surface-trapped holes. In this scenario, those two trapped holes coupled with each other to create an alternative pathway with high efficiency for forming the rate-limiting O—O bond in water oxidation (FIG. 2.17*b*).[2] For water oxidation, from the point of thermodynamics, the oxidation of $OH^-$ ions is much easier than the oxidation of $H_2O$ molecules.[42] Herein, the oxidation of $OH^-$ was considered as the major contribution to the observed PEC activities (FIG. 2.18).

Both aforementioned two-hole and four-hole reaction kinetics implied that $TiO_2$ alone provided active sites for water oxidation, which should follow the sequential pathway as shown in Scheme 1 b. The sequential pathway required more than one hole to be trapped at HTM, but the sluggish proton-coupled hole transfer greatly hindered this process. On the other hand, it is noted that photo-generated hot holes and electrons on Au were both transferred and trapped on $TiO_2$.[14, 32] Thus, it is inevitable that $TiO_2$ would function as an electron-hole recombination center (FIG. 1.1D). Indeed, simultaneous photocurrent measurements on Au and $TiO_2$ confirmed that less than 10% of hot carriers survived from the electron-hole recombination at Au/$TiO_2$ interfaces under open-circuit conditions (Supplementary Note 5 and FIGS. 2.19 to 2.22), which severely hindered photocatalytic activities. Hence, it is necessary to develop strategies to efficiently improve physical separation of photo-generated hot electrons and holes in Au/$TiO_2$ heterostructures. Considering the slower mobility of holes than electrons,[36-37] it would be ideal to retain hot holes on Au while transfer hot electrons to $TiO_2$.

Molecular redox adsorbates have been demonstrated to trap and stabilize photo-generated hot holes.[43-44] For driving multi-hole reactions, adsorbates need to be redox-active and also stable under water-oxidation conditions.[3] Catechol, a reductive form of quinone derivatives that are commonly used as redox mediators in natural photosynthesis (PSII system)[45-46] and metal-organic complexes,[44, 47-48] is expected to effectively store hot holes and assist multi-hole reactions when it adsorbs on Au surfaces in Au/$TiO_2$ heterostructures.

Catechol was photoelectrodeposited on Au/$TiO_2$ heterostructures (Supplementary Note 6 and FIGS. 2.23 to 2.25). Upon visible-light illumination, photo-generated hot holes oxidized catechol monomers and induced the oligomerization to form oligo-catechol on Au surfaces, which further trapped hot holes via a one-hole process of oxidizing the hydroxyl group (C—OH) to the ketone group (C═O) (Table S5 and FIG. 2.26). In LSV measurements, the deposited catechol increased the photocurrent at 1.2 $V_{RHE}$ from 47 μA to 84 μA (FIG. 1.2A and FIG. 2.27), showing an ~80% enhancement in PEC water oxidation. Meanwhile, the onset potential of LSV curve anodically shifted by ~60 mV (FIG. 1.2A), suggesting that new active sites were generated upon the adsorption of catechol. The reproducibility of the photocurrent enhancement was discussed in FIG. 2.28. In contrast to the enhanced photocurrent, $V_{ph}$ on $TiO_2$ of the catechol-modified Au/$TiO_2$ was significantly suppressed (FIG. 1.2B) while $V_{ph}$ on Au was enhanced (FIG. 2.29). This observation indicated that a portion of hot holes was directly trapped by catechol on Au but not transferred to $TiO_2$ (FIG. 1.2C), consistent with the positive Au (binding energy of Au $4f_{7/2}$=84.8±0.1 eV) in the XPS spectrum (FIG. 2.30). It is also noted that EIS measurements showed a decreased capacitance of trapped holes on $TiO_2$ after the deposition of catechol (FIG. 2.31), affirming that fewer hot holes were transferred to $TiO_2$ (Supplementary Note 7, and FIGS. 2.32 and 2.33).

The adsorption of catechol on Au/$TiO_2$ heterostructures was further found to lower the reaction order of $TiO_2$-trapped holes in PEC water oxidation. When RDS only involved $TiO_2$-trapped holes, the reaction order of $TiO_2$-trapped holes was 2 (FIG. 1.1C). However, once catechol-trapped holes were involved in RDS, the reaction order of $TiO_2$-trapped holes dropped to ~0.5 (FIG. 1.2D and FIG. 2.34). This significant change indicated that statistically fewer $TiO_2$-trapped holes participated in RDS of water oxidation when compared to those on the pristine Au/$TiO_2$. The rate law analysis (Supplementary Note 8) predicted a reaction order of 1 for $TiO_2$-trapped holes when RDS involved one $TiO_2$-trapped hole and one catechol-trapped hole. To further obtain a reaction order below 1, RDS should involve multiple elementary steps and at least one of them does not involve $TiO_2$-trapped holes. Therefore, catechol molecules adsorbed on Au should introduce a new reaction pathway for water oxidation (FIG. 1.2C).

FIG. 1.1C showed that RDS of visible-light-driven water oxidation required two holes under neutral conditions. Although one catechol has two hydroxyl groups and the redox of each hydroxyl group can trap one hole, the weak oxidative capability of semiquinone made it difficult to have two C═O units work together to provide two holes for driving water oxidation (FIG. 2.35A).[48-5o] Thus, the two-hole RDS should happen either via sequential oxidations of one hydroxyl group of catechol (FIGS. 2.35B and C) or through the cooperation between holes initially trapped on catechol and holes newly generated on Au (FIG. 2.35D).

Those two reaction pathways can be distinguished by looking into the hot-hole trapping and releasing on Au as only the cooperation pathway involved newly generated holes on Au in RDS. FIG. 1.3A showed that the Au/catechol electrode (catechol was photoelectrodeposited on a Au NP electrode, Supplementary Note 9 and FIG. 2.36) that was fully charged by hot holes (i.e., all hydroxyl groups were oxidized to ketone groups, FIG. 2.37) exhibited a much larger $V_{ph}$ (~100 mV) than that on the bare Au NP electrode (20 mV), indicating the greatly enhanced electron-hole separation induced by adsorbed catechol. The subsequent decay of $V_{ph}$ on the Au/catechol electrode (~70 mV at steady state, FIG. 1.3A) implied an automatic release of trapped holes via reacting with water. To monitor the hole-releasing dynamics, OCP measurements were performed immediately after electrodes were fully charged with hot holes (FIG. 1.36). A fast decay of OCP towards the cathodic direction was observed (the grey curve in FIG. 1.36) and the fitting of OCP curve using the exponential decay equation (the orange curve in FIG. 1.3B) showed timescales of 23 s and 119 s. In contrast, the bare Au NP electrode showed a much slower decay of OCP (the green curve in FIG. 1.36) with timescales of 44 s and 379 s (the blue curve in FIG. 1.36), indicating a slow recovery of Au surfaces from oxidized Au.[51] The oxidized Au can be considered as a form of "inactive" surface-trapped holes that were unable to be released to oxidize water before energy dissipation, leading to the low water-oxidation activity on the bare Au surface (FIG. 2.3). Thus, the catechol-accelerated hole releasing dynamics on Au suggested that initially "inactive" surface-trapped holes (oxidized Au) were "activated" by catechol-trapped holes and then those adjacent trapped holes worked cooperatively for driving water oxidation.

As shown in FIG. 2.35*d*, this cooperation pathway required the hole-trapping site to be on Au surfaces that also worked as the active site. In order to identify the role of Au surfaces in water oxidation, catechol molecules were modified with the cyanide group (i.e., 3,4-dihydroxybenzonitrile) to spatially separate the hole-trapping site (hydroxyl groups) away from Au surfaces (FIG. 1.4D, Supplementary Note 10, and FIGS. 2.38 and 2.39) as the cyanide group adsorbs on Au stronger than the hydroxyl group.[52] LSV measurements showed that the onset potential of Au/cyanide-catechol electrode was cathodically shifted by 150 mV when compared with the bare Au NP electrode (FIG. 1.4A), indicating that hot holes were able to be trapped on hydroxyl groups on the Au/cyanide-catechol electrode (FIG. 1.4D). However, the photo-response on this electrode was found to be negligible (FIG. 1.4A). Chronoamperometry (I-t) measurements further demonstrated that the Au/cyanide-catechol electrode only produced a photocurrent of 0.21 μA, which was comparable to that of the bare Au NP electrode (0.17 μA) (FIG. 1.4B). Taken together, the low photocurrent response from Au/cyanide-catechol electrode strongly suggested that hot holes trapped at hydroxyl groups alone were not able to drive water oxidation. Instead, Au surfaces were necessarily needed in water oxidation by providing active sites. Therefore, those trapped holes should be located at Au/catechol interfaces.

LSV measurements on the Au/catechol electrode showed a largely enhanced photo-response (red curves in FIG. 1.4A) when compared to the bare Au NP electrode (black curves in FIG. 1.4A). I-t measurement at 1.2 $V_{RHE}$ further confirmed that the photocurrent on Au/catechol electrode was boosted by one order of magnitude (3.28 μA, FIG. 1.46) compared with that on the bare Au NP electrode (0.17 μA, FIG. 1.4B). The reproducibility of the photocurrent enhancement was discussed in FIG. 2.40. The faradaic efficiency of the evolved oxygen was measured to be 86% (FIG. 2.41). All these results confirmed that hot holes trapped at Au/catechol interfaces were capable of driving water oxidation (FIG. 1.4C, Supplementary Note 11, and FIGS. 2.40 to 2.44). As illustrated in FIG. 5, both Au surfaces and catechol initially resided at their reduced states (i.e., Au (0) and C—OH bond, step I in FIG. 1.5). The first transferred hot hole oxidized C—OH to C═O (step II in FIG. 1.5), which was treated as a long-lived trapped hole. Another hole oxidized Au (adjacent to the formed C═O) and led to the formation of Au—OH (step III in FIG. 1.5). The cooperation of C═O and Au—OH then led to the rate-limiting O—O formation that produced Au—OOH (step IV in FIG. 1.5). Photo-excited holes in step IV and V maintained catechol at the oxidized state (in the form of C═O). Catechol-trapped hot holes further oxidized Au—OOH and released $O_2$ to complete water oxidation (steps V and VI in FIG. 1.5). The reversible process between quinone and hydroquinone was supported by photocurrent recovery as shown in FIG. 2.45. As a proof-of-concept, the multi-hole cooperation mechanism has been confirmed to be an effective strategy for driving water oxidation. Further improvement of water oxidation activity can be realized by material designs, such as controlling the morphology and facets of Au nanoparticles for exposing more adsorption and active sites.

CONCLUSION

We have successfully developed a molecular approach to stabilize photo-generated hot holes on Au/$TiO_2$ heterostructures for driving water oxidation under visible-light illumination. Since water oxidation represents a typical type of slow chemical reactions driven by multiple charge carriers, it is expected that the newly created reaction pathway, the multi-hole cooperation, would be extendable to various multi-hole (or -electron) photochemical reactions at metal/semiconductor or metal/molecule interfaces. Taken together, our studies provide a molecular-level understanding of hot-hole-induced photocatalysis, highlighting the visible-light-mediated multi-hole collaboration as a new avenue for facilitating photochemical processes.

REFERENCES AND NOTES

1. Le Formal, F.; Pastor, E.; Tilley, S. D.; Mesa, C. A.; Pendlebury, S. R.; Grätzel, M.; Durrant, J. R., Rate Law Analysis of Water Oxidation on a Hematite Surface. J. Am. Chem. Soc. 2015, 137, 6629-6637.
2. Zhang, Y.; Zhang, H.; Liu, A.; Chen, C.; Song, W.; Zhao, J., Rate-Limiting O—O Bond Formation Pathways for Water Oxidation on Hematite Photoanode. J. Am. Chem. Soc. 2018, 140, 3264-3269.
3. Chen, H.-Y.; Ardo, S., Direct observation of sequential oxidations of a titania-bound molecular proxy catalyst generated through illumination of molecular sensitizers. Nat. Chem. 2018, 10, 17-23.
4. Beiler, A. M.; Moore, G. F., Caught in the act. Nat. Chem. 2017, 10, 3.
5. Mesa, C. A.; Kafizas, A.; Francàs, L.; Pendlebury, S. R.; Pastor, E.; Ma, Y.; Le Formal, F.; Mayer, M. T.; Grätzel, M.; Durrant, J. R., Kinetics of Photoelectrochemical Oxidation of Methanol on Hematite Photoanodes. J. Am. Chem. Soc. 2017, 139, 11537-11543.
6. Inoue, H.; Shimada, T.; Kou, Y.; Nabetani, Y.; Masui, D.; Takagi, S.; Tachibana, H., The Water Oxidation Bottleneck in Artificial Photosynthesis: How Can We Get Through It? An Alternative Route Involving a Two-Electron Process. ChemSusChem 2011, 4, 173-179.
7. Anson, C. W.; Stahl, S. S., Cooperative Electrocatalytic 02 Reduction Involving Co(salophen) with p-Hydroquinone as an Electron—Proton Transfer Mediator. J. Am. Chem. Soc. 2017, 139, 18472-18475.
8. Christopher, P.; Moskovits, M., Hot Charge Carrier Transmission from Plasmonic Nanostructures. Annu. Rev. Phys. Chem. 2017, 68, 379-398.
9. Zhang, Y.; He, S.; Guo, W.; Hu, Y.; Huang, J.; Mulcahy, J. R.; Wei, W. D., Surface-Plasmon-Driven Hot Electron Photochemistry. Chem. Rev. 2018, 118, 2927-2954.
10. Linic, S.; Christopher, P.; Ingram, D. B., Plasmonic-metal nanostructures for efficient conversion of solar to chemical energy. Nat. Mater. 2011, 10, 911-921.
11. Brongersma, M. L.; Halas, N. J.; Nordlander, P., Plasmon-induced hot carrier science and technology. Nat. Nanotechnol. 2015, 10, 25-34.
12. Aslam, U.; Rao, V. G.; Chavez, S.; Linic, S., Catalytic conversion of solar to chemical energy on plasmonic metal nanostructures. Nat. Catal. 2018, 1, 656-665.

13. Kazuma, E.; Jung, J.; Ueba, H.; Trenary, M.; Kim, Y., Real-space and real-time observation of a plasmon-induced chemical reaction of a single molecule. Science 2018, 360, 521-526.
14. Knight, M. W.; Sobhani, H.; Nordlander, P.; Halas, N. J., Photodetection with Active Optical Antennas. Science 2011, 332, 702-704.
15. Zhou, L.; Swearer, D. F.; Zhang, C.; Robatjazi, H.; Zhao, H.; Henderson, L.; Dong, L.; Christopher, P.; Carter, E. A.; Nordlander, P.; Halas, N. J., Quantifying hot carrier and thermal contributions in plasmonic photocatalysis. Science 2018, 362, 69-72.
16. Mubeen, S.; Lee, J.; Singh, N.; Kramer, S.; Stucky, G. D.; Moskovits, M., An autonomous photosynthetic device in which all charge carriers derive from surface plasmons. Nat. Nanotechnol. 2013, 8, 247-251.
17. Zhang, Y.; Yam, C.; Schatz, G. C., Fundamental Limitations to Plasmonic Hot-Carrier Solar Cells. J. Phys. Chem. Lett. 2016, 7, 1852-1858.
18. Brus, L., Noble Metal Nanocrystals: Plasmon Electron Transfer Photochemistry and Single-Molecule Raman Spectroscopy. Acc. Chem. Res. 2008, 41, 1742-1749.
19. Sundararaman, R.; Narang, P.; Jermyn, A. S.; Goddard Hi, W. A.; Atwater, H. A., Theoretical predictions for hot-carrier generation from surface plasmon decay. Nat. Commun. 2014, 5,
20. Hu, C.; Chen, X.; Jin, J.; Han, Y.; Chen, S.; Ju, H.; Cai, J.; Qiu, Y.; Gao, C.; Wang, C.; Qi, Z.; Long, R.; Song, L.; Liu, Z.; Xiong, Y., Surface Plasmon Enabling Nitrogen Fixation in Pure Water through a Dissociative Mechanism under Mild Conditions. J. Am. Chem. Soc. 2019, 141, 7807-7814.
21. Zandi, 0.; Agrawal, A.; Shearer, A. B.; Reimnitz, L. C.; Dahlman, C. J.; Steller, C. M.; Milliron, D. J., Impacts of surface depletion on the plasmonic properties of doped semiconductor nanocrystals. Nat. Mater. 2018, 17, 710-717.
22. Tan, S.; Argondizzo, A.; Ren, J.; Liu, L.; Zhao, J.; Petek, H., Plasmonic coupling at a metal/semiconductor interface. Nat. Photonics 2017, 11, 806-812.
23. Shi, X.; Ueno, K.; Oshikiri, T.; Sun, Q.; Sasaki, K.; Misawa, H., Enhanced water splitting under modal strong coupling conditions. Nat. Nanotechnol. 2018, 13, 953-958.
24. Kim, Y.; Smith, J. G.; Jain, P. K., Harvesting multiple electron—hole pairs generated through plasmonic excitation of Au nanoparticles. Nat. Chem. 2018, 10, 763-769.
25. Zhan, C.; Chen, X.-J.; Yi, J.; Li, J.-F.; Wu, D.-Y.; Tian, Z.-Q., From plasmon-enhanced molecular spectroscopy to plasmon-mediated chemical reactions. Nat. Rev. Chem. 2018, 2, 216-230.
26. Yang, W.-C. D.; Wang, C.; Fredin, L. A.; Lin, P. A.; Shimomoto, L.; Lezec, H. J.; Sharma, R., Site-selective CO disproportionation mediated by localized surface plasmon resonance excited by electron beam. Nat. Mater. 2019, 18, 614-619.
27. Zhai, Y.; DuChene, J. S.; Wang, Y.-C.; Qiu, J.; Johnston-Peck, A. C.; You, B.; Guo, W.; DiCiaccio, B.; Qian, K.; Zhao, E. W.; Ooi, F.; Hu, D.; Su, D.; Stach, E. A.; Zhu, Z.; Wei, W. D., Polyvinylpyrrolidone-induced anisotropic growth of gold nanoprisms in plasmon-driven synthesis. Nat. Mater. 2016, 15, 889-895.
28. Polte, J.; Erler, R.; Thünemann, A. F.; Sokolov, S.; Ahner, T. T.; Rademann, K.; Emmerling, F.; Kraehnert, R., Nucleation and Growth of Gold Nanoparticles Studied via in situ Small Angle X-ray Scattering at Millisecond Time Resolution. ACS Nano 2010, 4, 1076-1082.
29. Le Formal, F.; Pendlebury, S. R.; Cornuz, M.; Tilley, S. D.; Grätzel, M.; Durrant, J. R., Back Electron—Hole Recombination in Hematite Photoanodes for Water Splitting. J. Am. Chem. Soc. 2014, 136, 2564-2574.
30. Wang, J.; Ding, T.; Wu, K., Charge Transfer from n-Doped Nanocrystals: Mimicking Intermediate Events in Multielectron Photocatalysis. J. Am. Chem. Soc. 2018, 140, 7791-7794.
31. Wang, J.; Ding, T.; Wu, K., Electron Transfer into Electron-Accumulated Nanocrystals: Mimicking Intermediate Events in Multielectron Photocatalysis II. J. Am. Chem. Soc. 2018, 140,
32. DuChene, J. S.; Sweeny, B. C.; Johnston-Peck, A. C.; Su, D.; Stach, E. A.; Wei, W. D., Prolonged Hot Electron Dynamics in Plasmonic-Metal/Semiconductor Heterostructures with Implications for Solar Photocatalysis. Angew. Chem. Int. Ed. 2014, 53, 7887-7891.
33. Furube, A.; Du, L.; Hara, K.; Katoh, R.; Tachiya, M., Ultrafast Plasmon-Induced Electron Transfer from Gold Nanodots into $TiO_2$ Nanoparticles. J. Am. Chem. Soc. 2007, 129, 14852-14853.
34. Jia, H.; Du, A.; Zhang, H.; Yang, J.; Jiang, R.; Wang, J.; Zhang, C.-y., Site-Selective Growth of Crystalline Ceria with Oxygen Vacancies on Gold Nanocrystals for Near-Infrared Nitrogen Photofixation. J. Am. Chem. Soc. 2019, 141, 5083-5086.
35. Wang, S.; Gao, Y.; Miao, S.; Liu, T.; Mu, L.; Li, R.; Fan, F.; Li, C., Positioning the Water Oxidation Reaction Sites in Plasmonic Photocatalysts. J. Am. Chem. Soc. 2017, 139, 11771-11778.
36. Liu, G.; Zhen, C.; Kang, Y.; Wang, L.; Cheng, H.-M., Unique physicochemical properties of two-dimensional light absorbers facilitating photocatalysis. Chem. Soc. Rev. 2018, 47, 6410-6444.
37. Chen, R.; Pang, S.; An, H.; Zhu, J.; Ye, S.; Gao, Y.; Fan, F.; Li, C., Charge separation via asymmetric illumination in photocatalytic $Cu_2O$ particles. Nat. Energy 2018, 3, 655-663.
38. Urso, C.; Barawi, M.; Gaspari, R.; Sirigu, G.; Kriegel, I.; Zavelani-Rossi, M.; Scotognella, F.; Manca, M.; Prato, M.; De Trizio, L.; Manna, L., Colloidal Synthesis of Bipolar Off-Stoichiometric Gallium Iron Oxide Spinel-Type Nanocrystals with Near-IR Plasmon Resonance. J. Am. Chem. Soc. 2016, 139, 1198-1206.
39. Zhang, Y.; Zhang, H.; Ji, H.; Ma, W.; Chen, C.; Zhao, J., Pivotal Role and Regulation of Proton Transfer in Water Oxidation on Hematite Photoanodes. J. Am. Chem. Soc. 2016, 138, 2705-2711.
40. Kim, Y.-S.; Kriegel, S.; Harris, K. D.; Costentin, C.; Limoges, B.; Balland, V., Evidencing Fast, Massive, and Reversible H+ Insertion in Nanostructured $TiO_2$ Electrodes at Neutral pH. Where Do Protons Come From? J. Phys. Chem. C 2017, 121, 10325-10335.
41. Klahr, B.; Gimenez, S.; Fabregat-Santiago, F.; Bisquert, J.; Hamann, T. W., Electrochemical and photoelectrochemical investigation of water oxidation with hematite electrodes. Energy Environ. Sci. 2012, 5, 7626-7636.
42. You, B.; Sun, Y., Innovative Strategies for Electrocatalytic Water Splitting. Acc. Chem. Res. 2018, 51, 1571-1580.

43. La Croix, A. D.; O'Hara, A.; Reid, K. R.; Orfield, N. J.; Pantelides, S. T.; Rosenthal, S. J.; Macdonald, J. E., Design of a Hole Trapping Ligand. Nano Lett. 2017, 17, 909-914.
44. Tachan, Z.; Hod, I.; Zaban, A., The $TiO_2$-Catechol Complex: Coupling Type II Sensitization with Efficient Catalysis of Water Oxidation. Adv. Eng. Mater. 2014, 4, 1301249.
45. Rappaport, F.; Diner, B. A., Primary photochemistry and energetics leading to the oxidation of the $(Mn)_4Ca$ cluster and to the evolution of molecular oxygen in Photosystem II. Coord. Chem. Rev. 2008, 252, 259-272.
46. Kato, M.; Cardona, T.; Rutherford, A. W.; Reisner, E., Photoelectrochemical Water Oxidation with Photosystem II Integrated in a Mesoporous Indium-Tin Oxide Electrode. J. Am. Chem. Soc. 2012, 134, 8332-8335.
47. Wada, T.; Tsuge, K.; Tanaka, K., Electrochemical oxidation of water to dioxygen catalyzed by the oxidized form of the bis(ruthenium-hydroxo) complex in H20. Angew. Chem. Int. Ed. 2000, 39, 1479-1481.
48. Tanaka, K.; Isobe, H.; Yamanaka, S.; Yamaguchi, K., Similarities of artificial photosystems by ruthenium oxo complexes and native water splitting systems. Proc. Natl Acad. Sci. 2012, 109, 15600-15605.
49. Wada, T.; Tsuge, K.; Tanaka, K., Syntheses and Redox Properties of Bis(hydroxoruthenium) Complexes with Quinone and Bipyridine Ligands. Water-Oxidation Catalysis. Inorg. Chem. 2001, 40, 329-337.
50. Muckerman, J. T.; Polyansky, D. E.; Wada, T.; Tanaka, K.; Fujita, E., Water Oxidation by a Ruthenium Complex with Noninnocent Quinone Ligands: Possible Formation of an O—O Bond at a Low Oxidation State of the Metal. Inorg. Chem. 2008, 47, 1787-1802.
51. Wang, P.; Krasavin, A. V.; Nasir, M. E.; Dickson, W.; Zayats, A. V., Reactive tunnel junctions in electrically driven plasmonic nanorod metamaterials. Nat. Nanotechnol. 2018, 13, 159-164.
52. Guttentag, A. I.; Wächter, T.; Barr, K. K.; Abendroth, J. M.; Song, T.-B.; Sullivan, N. F.; Yang, Y.; Allara, D. L.; Zharnikov, M.; Weiss, P. S., Surface Structure and Electron Transfer Dynamics of the Self-Assembly of Cyanide on Au{111}. J. Phys. Chem. C 2016, 120, 26736-26746.

Supplemental Information for Example 1

Experimental section

Materials: Tetrachloroauric acid ($HAuCl_4$, 99.99%), Titanium (IV) butoxide (97%), 1,2-Dihydroxybenzene (≥99%), 4-Nitrocatechol (97%), 3,4-Dihydroxybenzonitrile (97%), Sodium sulfite (≥98%), Methanol (99.8%), Ethanol (>99.5%), and Hydrochloric acid (HCl, 37%) were purchased from Sigma Aldrich. Sodium hydroxide (NaOH, >97.0%) was purchased from Fisher Scientific. Deuterated water ($D_2O$, 99.9%) were purchased from Cambridge Isotope Laboratories, Inc. All chemicals were used as received without further purification.

Instrumentation: Ultraviolet-visible (UV-vis) spectra were collected on a Shimadzu UV-2600 spectrophotometer. Scanning electron microscopy (SEM) images were collected on an FEI Nova Nano 430 SEM operated at 15 kV at the Nanoscale Research Facility of University of Florida (UF). Photoelectrochemical (PEC) measurements were controlled by a potentiostat (PGSTAT302N autolab, Metrohm). Additional dual mode bipotentiostat (BA) module and PX1000 module were used for dual-working electrode (DWE) PEC experiments. Three mono-wavelength LED lamps (470 nm, 530 nm, and 630 nm) controlled by PGSTAT302N were used as light sources. X-ray photoelectron spectroscopy (XPS) data were obtained using a PHI VersaProbe Scanning XPS Microscope (Al Kα) with an energy resolution of 0.1 eV. 0.21 kV Argon ions were used to neutralize surface charge. Adventitious carbon with the binding energy of 284.8 eV was used as a reference for calibration. Annular dark-field scanning transmission electron microscopy (ADF-STEM) imaging was conducted on a Cs-corrected Hitachi HD-2700C microscope equipped with a Cold-FEG and operated at 200 kV (located at BNL, Upton, NY). Images were acquired using a probe convergence angle of 23 mrad, with the inner collection angle of ADF detector at 53 mrad. Liquid chromatography-mass spectroscopy (LC-MS) data were obtained using an LCQ DECA quadrupole ion trap mass spectrometer with electrospray ionization (ESI) operating with XCALIBUR 2.0.7. SP1. High-performance liquid chromatography (HPLC) was conducted using Agilent (Palo Alto, CA) 1100 series system consisting of G1313A autosampler, G1322A degasser, and G1312A binary pump. Mobile phase A was $H_2O$+0.2% acetic acid and phase B was methanol+0.2% acetic acid.

Fabrication of Au/$TiO_2$ electrodes: Rutile $TiO_2$ nanowire electrodes were fabricated using a hydrothermal method.' FTO substrates were first cleaned in a mixed solution of 10 mL of acetone, 10 mL of 2-propanol, and 10 mL of nanopure water for 1 h ultrasonication. FTO substrates then were rinsed using nanopure water, airdried, and placed at an angle against the sidewall of a 40 mL Teflon-lined autoclave. In a separate 100 mL beaker, 15 mL of nanopure water and 15 mL of concentrated HCl (37 wt %) were mixed, followed by addition of 500 μL of Ti (IV) butoxide. The solution was stirred for 5 min and poured into a 40 mL Teflon-lined autoclave containing FTO substrates. Hydrothermal synthesis was conducted in an oven at 150° C. for 5 h. Photochemical growth of Au nanoparticles (NPs) on $TiO_2$ electrodes was performed in a solution containing 200 μL of methanol, 250 μL of 10 mM $HAuCl_4$, and 4.8 mL of nanopure water in a 50-mL beaker. The solution was irradiated for 5 min with a 500 W Hg lamp (full spectrum). Briefly ultrasonicating electrodes in water (~5 s) removed Au NPs not strongly bound to $TiO_2$ nanowires. Electrodes were further annealed under 200° C. for 10 min in a tube furnace. For fabricating DWE, a 10 nm Au film was deposited on Au/$TiO_2$ electrodes by sputtering (model KJL CMS-18 MULTI-SOURCE).

Fabrication of Au NP electrodes: A 10 nm Au film was deposited on FTO substrates by sputtering (model KJL CMS-18 MULTI-SOURCE). Further annealing under 600° C. for 1 h converted the Au film to Au NPs.

Photoelectrodeposition of catechol and charging of modified electrodes: As-prepared Au/$TiO_2$ electrodes and Au NP electrodes were immersed in a 0.1 M catechol solution for 24 h in the dark and then an anodic bias of 1.0 $V_{RHE}$ was applied to electrodes for 240-600 s under the irradiation of a 470 nm LED. After being modified with catechol, electrodes were rinsed with nanopure water to remove catechol weakly bound to the electrodes. Then electrodes were put into an unbuffered solution with pH 7.0 (0.1 M $NaClO_4$). A bias of 1.2 $V_{RHE}$ was held for 1 h under 470 nm illumination to fully charge electrodes with hot holes. Those as-prepared electrodes were moved to a clean unbuffered solution with pH 7.0 for PEC water-oxidation measurement.

Photodeposition of catechol on Au/$TiO_2$ electrodes: As-prepared Au/$TiO_2$ electrodes were immersed in a 0.1 M catechol solution under the irradiation of a 470 nm LED for 10 h. After being modified with catechol, electrodes were rinsed with nanopure water to remove catechol weakly bound to the electrodes.

PEC measurement: Conventional PEC experiments were performed in a three-electrode electrochemical cell and DWE PEC experiments were performed in a four-electrode electrochemical cell, both with Pt as the counter electrode and Ag/AgCl as the reference electrode. For electrochemical impedance spectroscopy (EIS), experimental data were fitted and simulated using Nova 1.11 from Metrohm Inc. pH values of electrolyte solutions were measured using a pH meter, and pD values were calculated using the equation $pD=pH_{read}+0.4$.[2] Concentrations of dissolved $O_2$ were measured using a YSI Professional Optical Dissolved Oxygen Meter. $N_2$ was purged into electrolyte for 1 h to remove dissolved $O_2$. It is noted that unbuffered solutions with pH 7.0 (0.1 M $NaClO_4$) and pH 13.6 (1 M NaOH) were used as electrolytes for main results in the manuscript. Buffer (e.g., $PO_4^{3-}$) was not used since previous works reported that buffer species influenced charge separations and surface proton transfer processes on semiconductors.[2-3] Experimental results obtained in the buffered solution (0.1 M $PO_4^{3-}$) were only shown in the supplementary information for reference. It also needs to be noted that catechol molecules adsorb on Au via hydroxyl groups. When performing the reaction in alkaline solutions, the competitive adsorption between hydroxyl groups and $OH^-$ions in the electrolyte would further decrease the stability of Au/catechol electrodes for water oxidation. Therefore, all those catechol-modified electrodes were tested in the neutral medium.

Supplementary Note 1. Open-circuit potential (OCP) measurement

OCP measurement was performed on a Au/$TiO_2$ electrode. As shown in FIG. 2.5A and Table S1, OCP decays consisted of a fast component and a slow component.

Average lifetimes of photo-generated carriers were calculated from OCP decays (FIG. 2.5B) using the flowing equation:[1]

$$\tau_n = -\frac{k_B T}{q}\left(\frac{dV_{oc}}{dt}\right)^{-1}$$

where $T_n$ represents average lifetimes of photo-generated carriers, $k_B$ is the Boltzmann constant, T is temperature (in Kelvin), q is the charge of an electron.

The exponential decay equation was also applied to get time constants considering that the existence of both fast and slow components of OCP decays:

$$y=y_0+A_1e^{-x/t_1}+A2e^{-x/t_2}$$

TABLE S1

Calculated time constants using the exponential decay equation

| | $y_0$ (V) | $A_1$ (V) | $t_1$ (s) | $A_2$ (V) | $t_2$ (s) |
|---|---|---|---|---|---|
| unbuffered pH 7.0 | 0.75 | −0.090 | 2.05 | −0.085 | 38.74 |
| buffered pH 7.0 | 0.69 | −0.100 | 2.04 | −0.100 | 38.34 |
| pH 13.6 | 0.88 | −0.400 | 0.44 | −0.038 | 10.76 |

Supplementary Note 2. Technique Issues in DWE Measurements

Before sputtering a 10 nm Au film, bare FTO on Au/$TiO_2$ electrodes was partially coated with epoxy resin that slightly touched the Au/$TiO_2$ part. The remained bare FTO was fully covered with Scotch tape. After sputtering, the Scotch tape was carefully peeled off with a razor blade and this exposed FTO was used as the first working electrode connection. The second working electrode connection was made by Cu conductive tape with Ag paint connected with the Au film that covered epoxy resin (FIG. 2.6D).

Previous DWE work emphasized that a conformal and crack-free electrocatalyst film was necessary to prevent short contact between the top Au film and bottom semiconductor substrates.[7-9] In those studies, bottom semiconductor substrates were photo-excited,[7-9] and the short contact would lead to a direct charge transfer from bottom semiconductor substrates to the top Au film. Since our research target was Au NPs, the short contact between the second working electrode Au film and the $TiO_2$ substrate cannot be avoided. Nonetheless, analysis of transfer of electrons and holes in the as-prepared dual-working Au/$TiO_2$ electrode suggested that the short contact between the Au film and $TiO_2$ should not be an issue for our study. As shown in FIG. 2.6D, Au NPs and the Au film formed an Ohmic contact while both Au NPs and the Au film formed the Schottky contact with $TiO_2$. Since there was an Ohmic contact, Au NPs and the Au film should be considered as an integral component during photo-excitation to generate hot electrons and holes.[9] Photo-generated hot electrons were transferred to $TiO_2$ from both Au NPs and the Au film. It is also noted that Schottky barriers would prevent the back transfer of hot electrons from $TiO_2$ to either Au NPs or the Au film. Indeed, the anodic bias applied on $TiO_2$ generated a negligible influence on the OCP of Au in the dark (FIG. 2.9B) while the OCP of Au moved towards the anodic direction under illumination (FIG. 2.9B), indicating that OCP variations of Au could only be caused by hot-carrier generation rather than the applied bias on $TiO_2$. Taken together, for the detection of hot carriers, the short contact between the Au film and $TiO_2$ showed negligible influence, and the first working electrode ($TiO_2$) and the second working electrode (Au film) were in fact separated.

Moreover, the Au film directly sputtered on $TiO_2$ did not show pronounced PEC water oxidation activity (FIG. 2.6A), indicating that the additional Au film did not generate new active sites for driving water oxidation. In general, the additional Au film should be viewed as a probe that did not change electron and hole transfer pathways in pristine Au/$TiO_2$ heterostructures.

A comparison of LSV traces between the pristine Au/$TiO_2$ electrode and the dual-working Au/$TiO_2$ electrode showed that PEC behaviors (onset potential and saturated photocurrent) were not remarkably affected by the additional Au film (FIG. 2.6A). Therefore, electrochemical properties obtained from the dual-working Au/$TiO_2$ electrode can be used to describe the pristine Au/$TiO_2$ electrode.

Previous DWE studies employed back-illuminations (i.e., from FTO sides to semiconductor substrates) to avoid light absorption of the additional Au film.[8] In our study, although the sputtered Au film also had visible-light absorption (FIG. 2.6B) and caused a decrease of 10% of the saturated photocurrent, the onset potential of PEC water oxidation on the dual-working Au/$TiO_2$ electrode under front-illumination remained the same as that under back-illumination (FIG. 2.7), suggesting that active sites of water oxidation on the dual-working Au/$TiO_2$ electrode were not changed regardless of the illumination direction. Another concern was that due to the 3D structure of $TiO_2$ substrate (nanowires), back-illumination would change transfer directions of electrons and holes and make the mechanistic study more complicated. Therefore, front-illumination was used in our study to mimic conventional PEC studies of Au/$TiO_2$ heterostructures.

Conductivity of the second working electrode was also a critical issue that needed to be addressed in the research of DWE.[7-8] It was found that holding an additional bias on the second working electrode (the same potential was applied on the first working electrode, $TiO_2$, simultaneously) led to ~93% decrease of the photocurrent obtained from $TiO_2$ (by comparing FIG. 2.16A and FIG. 2.19A), implying that the electric field sufficiently transported to Au NPs via the Au film and counteracted the original electric field that drove electron transfer provided by the first working electrode. On the other hand, in the dark condition the potential control on Au led to the OCP variation of $TiO_2$ towards the same direction with similar extent (FIG. 2.9D), further demonstrating that the second working electrode had a good conductivity, and the electric field was able to sufficiently transport to $TiO_2$ via the second working electrode (Au film).

Supplementary Note 3. Electrochemical Impedance Spectroscopy (EIS)

Surface-trapped holes on a Au/$TiO_2$ photoanode under PEC water oxidation was investigated by fitting and simulating EIS data using a well-developed electric model. As shown in FIG. 2.11 $R_s$ stands for the series resistance, $C_{bulk}$ represents the capacitance of Helmholtz layer and depletion region on the surface of electrodes, $R_{trapping}$ represents the resistance of hole trapping process at surface states, $C_{trap}$ represents the amount of surface-trapped holes, and $R_{ct,trap}$ represents the resistance of charge transfer across the interface.[2, 10] The fitted parameters were listed in FIG. 2.12 Table S2 and S3.

The series resistance $R_s$ was a constant (~10 Ω as shown in Table S2) under various mono-wavelength irradiations and applied potentials, indicating that the fitting and simulation process was reliable for Au/$TiO_2$[11] $C_{trap}$ decreased with the applied bias while $R_{ct,trap}$ increased with the applied bias (FIG. 2.12), implying the discharging of surface states (i.e., releasing of surface trapped holes) proceeded with water oxidation.[2, 10, 12-13] The amount of surface-trapped holes ($C_{trap}$) was larger in the unbuffered solution with pH 7.0 than that in the buffered solution with pH 7.0 and pH 13.6 (FIG. 2.13A). Since $C_{trap}$ was a balance between the hole trapping process and the hole releasing process,[2,13] the larger $C_{trap}$ suggested that the surface trapped holes were not able to sufficiently transfer to water molecules under the unbuffered pH 7.0 condition as those under the buffered pH 7.0 and pH 13.6 conditions.

TABLE S2

Parameters calculated from EIS data obtained under various illuminations

| Wavelength | Potential ($V_{RHE}$) | $R_s$ (Ω) | $C_H$ (μF) | $R_{trapping}$ (Ω) | $R_{ct,trap}$ (Ω) | $C_{trap}$ (μF) | $T_{trap}$ (s) |
|---|---|---|---|---|---|---|---|
| 470 nm | 0.4 | 10.6 | 13.2 | 419 | 2190 | 159.0 | 0.34 |
| | 0.5 | 10.5 | 11.5 | 531 | 3940 | 59.0 | 0.23 |
| | 0.6 | 10.4 | 11.6 | 707 | 8060 | 30.4 | 0.24 |
| | 0.7 | 10.3 | 11.6 | 949 | 15600 | 19.5 | 0.30 |
| | 0.8 | 10.3 | 10.9 | 928 | 29200 | 16.4 | 0.48 |
| | 1.0 | 10.3 | 10.2 | 622 | 91500 | 13.9 | 1.27 |
| | 1.2 | 10.3 | 10.4 | 508 | 120000 | 14.2 | 1.70 |
| 530 nm | 0.5 | 10.5 | 11.1 | 1860 | 10700 | 31.9 | 0.34 |
| | 0.6 | 10.4 | 10.9 | 2810 | 22300 | 15.8 | 0.35 |
| | 0.7 | 10.4 | 10.7 | 3700 | 53600 | 11.3 | 0.60 |
| | 0.8 | 10.4 | 10.6 | 5260 | 135000 | 9.3 | 1.25 |
| | 1.0 | 10.4 | 10.4 | 5060 | 192000 | 9.0 | 1.72 |
| | 1.2 | 10.4 | 10.7 | 6060 | — | 10.7 | — |

TABLE S2-continued

Parameters calculated from EIS data obtained under various illuminations

| Wavelength | Potential ($V_{RHE}$) | $R_s$ (Ω) | $C_H$ (μF) | $R_{trapping}$ (Ω) | $R_{ct,trap}$ (Ω) | $C_{trap}$ (μF) | $T_{trap}$ (s) |
|---|---|---|---|---|---|---|---|
| 630 nm | 0.6 | 9.1 | 11.4 | 1720 | 15300 | 19.0 | 0.29 |
| | 0.7 | 9.2 | 10.8 | 3030 | 26900 | 14.8 | 0.39 |
| | 0.8 | 9.2 | 10.4 | 3880 | 70300 | 15.4 | 1.08 |
| | 0.9 | 9.3 | 10.1 | 3380 | 416000 | 13.1 | 5.40 |
| | 1.0 | 9.3 | 10.2 | 4390 | — | 11.4 | — |
| | 1.2 | 9.3 | 10.5 | 6870 | — | 12.1 | — |

TABLE S3

Parameters calculated from EIS data obtained under various electrolyte conditions

| | Potential ($V_{RHE}$) | $R_s$ (Ω) | $C_H$ (μF) | $R_{trapping}$ (Ω) | $R_{ct,trap}$ (Ω) | $C_{trap}$ (μF) | $T_{trap}$ (s) |
|---|---|---|---|---|---|---|---|
| Unbuffered | 0.5 | 17.4 | 11.7 | 297 | 1240 | 302.0 | 0.37 |
| pH 7.0 | 0.6 | 17.2 | 11.3 | 326 | 1830 | 213.0 | 0.39 |
| | 0.7 | 17.2 | 10.7 | 363 | 1860 | 171.0 | 0.32 |
| | 0.8 | 17.1 | 10.3 | 408 | 2950 | 84.4 | 0.25 |
| | 0.9 | 17.0 | 11.3 | 583 | 5920 | 39.4 | 0.23 |
| | 1.0 | 16.8 | 12.3 | 996 | 13600 | 22.0 | 0.30 |
| | 1.1 | 16.8 | 11.8 | 1320 | 28200 | 16.7 | 0.47 |
| Buffered | 0.4 | 29.3 | 16.1 | 399 | 817 | 147.0 | 0.12 |
| pH 7.0 | 0.5 | 28.9 | 13.5 | 480 | 2990 | 94.7 | 0.28 |
| | 0.6 | 28.4 | 13.8 | 796 | 6920 | 38.2 | 0.26 |
| | 0.7 | 28.0 | 13.7 | 1330 | 16600 | 20.4 | 0.34 |
| | 0.8 | 27.9 | 13.4 | 2070 | 32900 | 14.2 | 0.47 |
| | 0.9 | 27.7 | 13.1 | 3310 | 53100 | 11.5 | 0.61 |
| | 1.0 | 27.5 | 12.6 | 4700 | 76100 | 10.8 | 0.82 |
| pH 13.6 | 0.4 | 10.6 | 13.2 | 419 | 2190 | 159.0 | 0.35 |
| | 0.5 | 10.5 | 11.5 | 531 | 3940 | 59.0 | 0.23 |
| | 0.6 | 10.4 | 11.6 | 707 | 8060 | 30.4 | 0.25 |
| | 0.7 | 10.3 | 11.6 | 949 | 15600 | 19.5 | 0.30 |
| | 0.8 | 10.3 | 10.9 | 928 | 29200 | 16.4 | 0.48 |
| | 1.0 | 10.3 | 10.2 | 622 | 91500 | 13.9 | 1.27 |
| | 1.2 | 10.3 | 10.4 | 508 | 120000 | 14.2 | 1.70 |

Supplementary Note 4. Equations for Reaction Order Analysis

Under steady state, the water-oxidation rate (photocurrent density, J in $\mu A/cm^2$) is related to the surface hole density ([hole] in nm-2) as:[14-15]

$$J=k_{wo}[\text{holes}]^{\beta}$$

$$\text{Log } J=\beta\log([\text{holes}])+\log k_{wo}$$

Where $k_m$ is the water oxidation rate constant, and β is the reaction order of surface trapped holes.

Surface hole density was calculated from EIS results based on the model circuit displayed in FIG. 2.11 and by the following equation:[15]

$$[\text{hole}] = C_{trap} * V_{appl} * \frac{R_{ct,trap}}{R_s + R_{trapping} + R_{ct,trap}} * S^{-1}$$

where $V_{appl}$ is the applied potential and S is the active area of electrodes.

TABLE S4

Parameters calculated from EIS data obtained under various electrolyte conditions for rate law analysis

| | Light intensity (mW · cm$^{-2}$) | $R_s$ (Ω) | $R_{trapping}$ (Ω) | $C_H$ (μF) | $R_{ct,trap}$ (Ω) | $C_{trap}$ (μF) | [hole] (nm$^{-2}$) | log [hole] | J (μA · cm$^{-2}$) | log J |
|---|---|---|---|---|---|---|---|---|---|---|
| pH 7.0 | 500 | 26.5 | 240 | 9.6 | 5320 | 420.0 | 3.120 | 0.494 | 1.75 | 0.243 |
| 0.5 $V_{RHE}$ | 453 | 26.5 | 250 | 9.7 | 4800 | 374.0 | 2.758 | 0.441 | 1.25 | 0.097 |
| | 402 | 26.5 | 263 | 9.7 | 5140 | 335.0 | 2.474 | 0.393 | 1.00 | 0.000 |
| | 345 | 26.4 | 295 | 9.6 | 5080 | 280.0 | 2.054 | 0.313 | 0.75 | −0.125 |
| | 277 | 26.4 | 354 | 9.5 | 5110 | 220.0 | 1.597 | 0.203 | 0.50 | −0.301 |
| pH 7.0 | 500 | 26.4 | 352 | 8.9 | 3380 | 61.9 | 0.612 | −0.213 | 12.25 | 1.088 |
| 0.7 $V_{RHE}$ | 453 | 26.3 | 369 | 9.1 | 3580 | 58.3 | 0.578 | −0.238 | 10.25 | 1.011 |
| | 402 | 26.3 | 418 | 9.3 | 3970 | 53.6 | 0.530 | −0.276 | 8.75 | 0.942 |
| | 345 | 26.4 | 503 | 9.4 | 4700 | 46.5 | 0.460 | −0.338 | 7.00 | 0.845 |
| | 277 | 26.4 | 635 | 9.4 | 6000 | 39.4 | 0.390 | −0.409 | 5.75 | 0.760 |
| pH 13.6 | 500 | 15.6 | 692 | 11.3 | 4480 | 35.1 | 0.236 | −0.626 | 6.25 | 0.796 |
| 0.5 $V_{RHE}$ | 453 | 15.6 | 717 | 11.4 | 4880 | 34.0 | 0.231 | −0.637 | 5.50 | 0.740 |
| | 402 | 15.5 | 786 | 11.3 | 5300 | 32.8 | 0.222 | −0.653 | 4.75 | 0.677 |
| | 345 | 15.6 | 878 | 11.1 | 5850 | 31.3 | 0.212 | −0.674 | 4.00 | 0.602 |
| | 277 | 15.6 | 1010 | 10.9 | 6580 | 29.1 | 0.196 | −0.707 | 2.75 | 0.439 |
| pH 13.6 | 500 | 18.9 | 1300 | 10.5 | 11600 | 11.1 | 0.110 | −0.960 | 13.00 | 1.114 |
| 0.7 $V_{RHE}$ | 453 | 18.9 | 1340 | 10.6 | 12500 | 10.4 | 0.103 | −0.986 | 11.25 | 1.051 |
| | 402 | 18.9 | 1450 | 10.5 | 13000 | 10.0 | 0.099 | −1.005 | 9.50 | 0.978 |
| | 345 | 18.9 | 1600 | 10.3 | 13500 | 9.8 | 0.096 | −1.016 | 8.00 | 0.903 |
| | 277 | 18.9 | 1960 | 10.2 | 13900 | 9.5 | 0.091 | −1.039 | 6.00 | 0.778 |
| pH 13.6 | 500 | 16.9 | 871 | 12.2 | 115 | 24.8 | 0.057 | −1.245 | 27.50 | 1.439 |
| $Na_2SO_3$ | 453 | 16.8 | 854 | 11.7 | 125 | 21.8 | 0.055 | −1.262 | 23.75 | 1.376 |
| 1.3 $V_{RHE}$ | 402 | 16.9 | 918 | 11.0 | 161 | 16.5 | 0.048 | −1.314 | 19.00 | 1.279 |
| | 345 | 16.9 | 1010 | 10.6 | 166 | 16.6 | 0.046 | −1.335 | 17.25 | 1.237 |
| | 277 | 16.9 | 1140 | 10.1 | 212 | 12.3 | 0.038 | −1.419 | 13.25 | 1.122 |

H/D kinetic isotope effect (KIE) experiment was performed to further confirm whether $H_2O$ molecules could be oxidized by hot holes, as oxidation of $H_2O$ molecules would lead to a pronounced KIE according to the previous PEC water oxidation research on semiconductors.[2] LSV curves of the Au/$TiO_2$ photoanode exhibited no significant difference between $H_2O$ and $D_2O$ under pH/pD 7.0, excluding the possibility to have the O—H bond cleavage in RDS. Therefore, the oxidation of $H_2O$ molecules should not be the major contribution to PEC activities. Instead, the oxidation of $OH^-$contributed to observed PEC activities in our work.

The Fermi level of Au is located ~0.3 V more cathodic than the redox potential of $O_2/H_2O$.[5] Considering that photogenerated hot holes on metals quickly relax to the Fermi level before chemical reactions occur,[22] those photo-generated holes are not able to directly drive the oxidation of $H_2O$ molecules. Hence, it is reasonable that the oxidation of $OH^-$ mainly contributes to PEC activities.

Supplementary Note 5. Simultaneous Photocurrent Measurement of Dual-Working Au/$TiO_2$ Electrodes Simultaneous photocurrent measurement was performed on Au and $TiO_2$ of a dual-working Au/$TiO_2$ electrode to study the electron transfer dynamics under quasi open-circuit conditions. Constant potentials were simultaneously applied on $TiO_2$ and Au, and the electric force applied on $TiO_2$ was offset from that on Au to mimic open-circuit conditions while still generated photocurrents on both $TiO_2$ and Au. The photocurrent obtained from $TiO_2$ was reduced by ~93% (5 μA, FIG. 2.19A) compared to that under closed-circuit conditions (70 μA, FIG. 2.20). Under open-circuit conditions, hot electrons generated on Au via interband transitions could hardly be transferred to $TiO_2$ since there was no electric field driving them towards $TiO_2$. Instead, hot electrons tended to recombine with hot holes on Au[21] and this recombination accounted for the ~93% loss of photocurrent under open-circuit conditions compared to that under closed-circuit conditions.

It is noted that under quasi open-circuit conditions, the photocurrent on $TiO_2$ was about two orders of magnitude higher than that on Au (under 470 nm irradiation in FIG. 2.19 and under 530 and 630 nm irradiation in FIG. 2.22). However, FIG. 2.21 showed that without Au NPs (i.e., $TiO_2$—Au film electrode), the photocurrent obtained from $TiO_2$ was the same as that obtained from Au, indicating that the observed photocurrent difference (FIG. 2.19) was caused by the photo-excitation of Au NPs. We further demonstrated that photocurrents of $TiO_2$ did not change with the applied bias on Au (FIG. 2.19). All these results suggested the existence of a direct electron transfer mechanism, in which the photoexcitation of Au directly led to generation of hot electrons in the conduction band of $TiO_2$.[22-23] Direct electron transfer in metal/semiconductor photocatalysts has been demonstrated to be an ultrafast process.[23] Since hot-hole transfer from Au to $TiO_2$ was found to be a proton-coupled process (FIG. 2.10), the mismatch of timescales of those two processes suppressed electron-hole recombination on $TiO_2$, which contributed to the substantial $V_{ph}$ obtained on Au/$TiO_2$ heterostructures (FIG. 2.5 and FIG. 2.8).

Supplementary Note 6. Preparation of Catechol-Modified Au/$TiO_2$ Electrodes

Catechol was photoelectrodeposited on Au/$TiO_2$ heterostructures under 1.0 $V_{RHE}$ and 470 nm irradiation for 240 s (FIG. 2.23). After the deposition, the electrode was moved to a clean electrolyte (0.1 M $NaClO_4$ with pH 7.0) without catechol and fully charged with hot holes under 1.2 $V_{RHE}$ and 470 nm irradiation for 1 h (FIG. 2.24). Also, photodeposition (i.e., without applied bias) was used to selectively deposit catechol only on Au of Au/$TiO_2$ heterostructures (FIG. 2.25). Without bias, the oligomerization of catechol on Au/$TiO_2$ was slow and thus a much longer irradiation time was needed (10 h).

TABLE S5

| Molecular weight (MW) of oligo-catechol obtained from LC-MS. | | | | | |
|---|---|---|---|---|---|
| | oligo-catechol | | | | |
| | Retention time | | catechol control | | oligo-catechol |
| MW | (RT) (min) | Total Area | RT (min) | Total Area | catechol control |
| MW 218 | 19.78 | 144,385,064 | 19.82 | 1,827,528 | 79.01 |
| MW 218 | 22.58 | 80,669,676 | 22.61 | 2,067,386 | 39.02 |
| m/z 443 ion | 23.92 | 1,873,403 | nd* | | |
| MW 218 | 25.45 | 107,152,534 | 25.45 | 2,566,451 | 41.75 |
| MW 218 | 25.90 | 15,132,772 | nd | | |
| MW 218 | 28.17 | 1,153,760 | 28.18 | 775,180 | 1.49 |
| MW 326 | 23.92 | 9,714,149 | nd | | |
| MW 216 | 34.12 | 6,176,494 | nd | | |

nd*: not detected.

Supplementary Note 7. Catechol-Modified $TiO_2$ Electrodes

Previous studies reported that catechol adsorbed on $TiO_2$ also introduced visible-light activity owing to the LMCT (ligand to metal charge transfer) mechanism.[24-25] FIG. 2.33 showed that modifying a $TiO_2$ electrode with catechol enhanced both photocurrent and $V_p$h. However, $V_{ph}$ was found to decrease on the catechol-modified Au/$TiO_2$ electrode, excluding LMCT as the primary mechanism contributing to the enhanced photocurrent on the catechol-modified Au/$TiO_2$ electrode.

Supplementary Note 8. Rate law analysis on the catechol-modified Au/$TiO_2$ electrode Analysis of the variation of reaction orders:

A=intermediate in RDS of water oxidation

B=holes trapped on $TiO_2$

C=holes trapped on catechol

D=holes on Au (1) B+B→A $$\frac{d[A]}{dt} = k_1[B][B] = k_1[B]^2$$

$$\ln\frac{d[A]}{dt} = \ln k_1 + 2\ln[B]$$

When RDS only involves two $TiO_2$-trapped holes, the reaction order of $TiO_2$-trapped holes is 2.

(2)B+C→A $$\frac{d[A]}{dt} = k_1[B][C]$$

$$\ln\frac{d[A]}{dt} = \ln k_1 + \ln[B] + \ln[C]$$

When RDS involves one $TiO_2$-trapped hole and one catechol-trapped hole, the reaction order of $TiO_2$-trapped holes is 1.

(3)B+C→A;D+C→A $$\frac{d[A]}{dt} = k_1[B][C] + k_2[D][C] = [C](k_1[B] + k_2[D])$$

$$\ln\frac{d[A]}{dt} = \ln k_1 + \ln(k_1[B] + k_2[D])$$

When RDS involves two parallel elementary steps, the reaction order of $TiO_2$-trapped holes is below 1.

Supplementary Note 9. Preparation of catechol-modified Au NP electrodes

Catechol was photoelectrodeposited on a Au NP electrode under 1.0 $V_{RHE}$ and 470 nm irradiation for 600 s (FIG. 2.36). After the deposition, the electrode was moved to a clean electrolyte (0.1 M $NaClO_4$ with pH 7.0) without catechol and fully charged by hot holes under 1.2 $V_{RHE}$ and 470 nm irradiation for 1 h (FIG. 2.37).

Supplementary Note 10. Comparisons Among Modified Au NP Electrodes Using Catechol, 3,4-Dihydroxybenzonitrile, and 4-Nitrocatechol Two catechol derivatives were used to modify Au NP electrodes, i.e., 3,4-dihydroxybenzonitrile (catechol with nitrile (—C≡N) substituent, abbreviated as cyanide-catechol), and 4-nitrocatechol. Cyanide-catechol was used for exploring the influence of adsorption mode (FIG. 2.4D) on hot-hole stabilization and water oxidation. 4-nitrocatechol was used to study the influence of electronic effect on hot-hole stabilization due to the electron-withdrawing effect of its nitro group. LSV measurements showed that catechol and cyanide-catechol modified electrodes shared an identical onset potential (0.73 $V_{RHE}$, FIG. 4*a*), indicating that oxidation potentials of hydroxyl groups on those adsorbates were the same. Therefore, the effect of adsorption mode was dominant when comparing PEC behaviors between catechol-modified and cyanide-catechol-modified Au NP electrodes as discussed in the main text. The 4-nitrocatechol-modified Au NP electrode exhibited an onset potential of ~0.76 V (FIG. 2.39*a*), which was more anodic than that on the cyanide-catechol-modified electrode. This observation implied that it was more difficult to trap hot holes on 4-nitrocatechol molecules. However, the 4-nitrocatechol-modified Au NP electrode exhibited a higher photocurrent (0.31 μA, FIG. 2.39B) than that of the cyanide-catechol-modified Au NP electrode (0.21 μA, FIG. 2.39B) at 1.2 $V_{RHE}$. The higher photocurrent indicated that despite of its difficult hole trapping, 4-nitrocatechol-modified Au NP electrode still exhibited better performance in driving water oxidation. Noting that 4-nitrocatechol also adsorbed on Au NPs via hydroxyl groups (same as catechol). Hence, it was easier to drive water oxidation when hydroxyl groups adsorbed on Au surfaces even if the molecule was less prone to trap hot holes. It can be concluded that the effect of adsorption mode overwhelmed the electronic effect (i.e. ease of trapping holes on hydroxyl groups) in the Au/adsorbate system for water oxidation.

$$Q_{o_2}=0.15\times20\times10^{-6}/32\times4\times96485=0.036C$$

$$Q_{photocurrent}=0.042C$$

$$FE\%=86\%$$

When further extending the reaction time, the photocurrent exhibited a very slow and continuous decayed within 20 hours. This decay should be due to the slow desorption of catechol molecules from Au surfaces under the harsh water-oxidation condition. Further improvement on the long-term stability of catechol-modified Au surfaces could be realized by molecular design, such as adding an Au-anchoring group adjacent to the hydroxyl group in catechol.

Supplementary Note 11. Catechol-Modified FTO Electrodes

The catechol-modified FTO electrode (FIG. 2.44) showed a photocurrent of 0.20 μA (black curves, FIG. 2.44), which was much lower than that on the Au/catechol electrode (3.28 μA, red curves, FIG. 2.44). The oxidized catechol (i.e., quinone) was reported to be active for the photo-oxidation of water,[26] but one order of magnitude enhancement in the presence of Au NPs strongly suggested that Au surfaces provided much more active sites for driving water oxidation.

References for the Supplemental Information

1. DuChene, J. S.; Sweeny, B. C.; Johnston-Peck, A. C.; Su, D.; Stach, E. A.; Wei, W. D., Prolonged Hot Electron Dynamics in Plasmonic-Metal/Semiconductor Heterostructures with Implications for Solar Photocatalysis. Angew. Chem. Int. Ed. 2014, 53, 7887-7891.
2. Zhang, Y.; Zhang, H.; Ji, H.; Ma, W.; Chen, C.; Zhao, J., Pivotal Role and Regulation of Proton Transfer in Water Oxidation on Hematite Photoanodes. J. Am. Chem. Soc. 2016, 138, 2705-2711.
3. Sheng, H.; Li, Q.; Ma, W.; Ji, H.; Chen, C.; Zhao, J., Photocatalytic Degradation of Organic Pollutants on Surface Anionized $TiO_2$: Common Effect of Anions for High Hole-availability by Water. Appl. Catal. B: Environ 2013, 138-139, 212-218.
4. Sundararaman, R.; Narang, P.; Jermyn, A. S.; Goddard III, W. A.; Atwater, H. A., Theoretical Predictions for Hot-carrier Generation from Surface Plasmon Decay. Nat. Commun. 2014, 5, 5788.
5. Hung, S.-F.; Xiao, F.-X.; Hsu, Y.-Y.; Suen, N.-T.; Yang, H.-B.; Chen, H. M.; Liu, B., Iridium Oxide-Assisted Plasmon-Induced Hot Carriers: Improvement on Kinetics and Thermodynamics of Hot Carriers. Adv. Eng. Mater. 2016, 6, 1501339.
6. Schlather, A. E.; Manjavacas, A.; Lauchner, A.; Marangoni, V. S.; DeSantis, C. J.; Nordlander, P.; Halas, N. J., Hot Hole Photoelectrochemistry on Au@$SiO_2$@Au Nanoparticles. J. Phys. Chem. Lett. 2017, 8, 2060-2067.
7. Lin, F.; Boettcher, S. W., Adaptive Semiconductor/Electrocatalyst Junctions in Water-splitting Photoanodes. Nat. Mater. 2014, 13, 81-86.
8. Qiu, J.; Hajibabaei, H.; Nellist, M. R.; Laskowski, F. A. L.; Hamann, T. W.; Boettcher, S. W., Direct in Situ Measurement of Charge Transfer Processes During Photoelectrochemical Water Oxidation on Catalyzed Hematite. ACS Central Sci. 2017, 3, 1015-1025.
9. Aslam, U.; Chavez, S.; Linic, S., Controlling Energy Flow in Multimetallic Nanostructures for Plasmonic Catalysis. Nat. Nanotechnol. 2017, 12, 1000-1005.
10. Zhang, Y.; Jiang, S.; Song, W.; Zhou, P.; Ji, H.; Ma, W.; Hao, W.; Chen, C.; Zhao, J., Nonmetal P-doped Hematite Photoanode with Enhanced Electron Mobility and High Water Oxidation Activity. Energy Environ. Sci. 2015, 8, 1231-1236.
11. Zhang, Y.; Zhou, Z.; Chen, C.; Che, Y.; Ji, H.; Ma, W.; Zhang, J.; Song, D.; Zhao, J., Gradient $FeO_x(PO_4)_y$ Layer on Hematite Photoanodes: Novel Structure for Efficient Light-Driven Water Oxidation. ACS Appl. Mater. Interfaces 2014, 6, 12844-12851.
12. Klahr, B.; Gimenez, S.; Fabregat-Santiago, F.; Bisquert, J.; Hamann, T. W., Electrochemical and Photoelectrochemical Investigation of Water Oxidation with Hematite Electrodes. Energy Environ. Sci. 2012, 5, 7626-7636.
13. Klahr, B.; Gimenez, S.; Fabregat-Santiago, F.; Hamann, T.; Bisquert, J., Water Oxidation at Hematite Photoelectrodes: the Role of Surface States. J. Am. Chem. Soc. 2012, 134, 4294-302.
14. Le Formal, F.; Pastor, E.; Tilley, S. D.; Mesa, C. A.; Pendlebury, S. R.; Grätzel, M.; Durrant, J. R., Rate Law Analysis of Water Oxidation on a Hematite Surface. J. Am. Chem. Soc. 2015, 137, 6629-6637.
15. Zhang, Y.; Zhang, H.; Liu, A.; Chen, C.; Song, W.; Zhao, J., Rate-Limiting O—O Bond Formation Pathways for Water Oxidation on Hematite Photoanode. J. Am. Chem. Soc. 2018, 140, 3264-3269.
16. Nakamura, R.; Nakato, Y., Primary Intermediates of Oxygen Photoevolution Reaction on $TiO_2$ (Rutile) Particles, Revealed by in Situ FTIR Absorption and Photoluminescence Measurements. J. Am. Chem. Soc. 2004, 126, 1290-1298.
17. Migani, A.; Blancafort, L., What Controls Photocatalytic Water Oxidation on Rutile $TiO_2$(110) under Ultra-High-Vacuum Conditions? J. Am. Chem. Soc. 2017, 139, 11845-11856.
18. Liu, F.; Feng, N.; Wang, Q.; Xu, J.; Qi, G.; Wang, C.; Deng, F., Transfer Channel of Photoinduced Holes on a $TiO_2$ Surface As Revealed by Solid-State Nuclear Magnetic Resonance and Electron Spin Resonance Spectroscopy. J. Am. Chem. Soc. 2017, 139, 10020-10028.
19. Shirai, K.; Fazio, G.; Sugimoto, T.; Selli, D.; Ferraro, L.; Watanabe, K.; Haruta, M.; Ohtani, B.; Kurata, H.; Di Valentin, C.; Matsumoto, Y., Water-Assisted Hole Trapping at the Highly Curved Surface of Nano-$TiO_2$ Photocatalyst. J. Am. Chem. Soc. 2018, 4, 1415-1422.
20. Cheng, J.; Sprik, M., Acidity of the Aqueous Rutile $TiO_2$(110) Surface from Density Functional Theory Based Molecular Dynamics. J. Chem Theo. and Comput. 2010, 6, 880-889.
21. Zheng, B. Y.; Zhao, H.; Manjavacas, A.; McClain, M.; Nordlander, P.; Halas, N. J., Distinguishing Between Plasmon-induced and Photoexcited Carriers in a Device Geometry. Nat. Commun. 2015, 6, 7797.
22. Christopher, P.; Moskovits, M., Hot Charge Carrier Transmission from Plasmonic Nanostructures. Annu. Rev. Phys. Chem. 2017, 68, 379-398.
23. Wu, K.; Chen, J.; McBride, J. R.; Lian, T., Efficient Hot-electron Transfer by a Plasmon-induced Interfacial Charge-transfer Transition. Science 2015, 349, 632-635.
24. Lana-Villarreal, T.; Rodes, A.; Pérez, J. M.; Gómez, R., A Spectroscopic and Electrochemical Approach to the Study of the Interactions and Photoinduced Electron Transfer between Catechol and Anatase Nanoparticles in Aqueous Solution. J. Am. Chem. Soc. 2005, 127, 12601-12611.
25. Tachan, Z.; Hod, I.; Zaban, A., The $TiO_2$—Catechol Complex: Coupling Type II Sensitization with Efficient Catalysis of Water Oxidation. Adv. Eng. Mater. 2014, 4, 1301249.
26. Pochon, A.; Vaughan, P. P.; Gan, D.; Vath, P.; Blough, N. V.; Falvey, D. E., Photochemical Oxidation of Water by 2-Methyl-1,4-benzoquinone: Evidence against the Formation of Free Hydroxyl Radical. J. Phys. Chem. A 2002, 106, 2889-2894.

The invention claimed is:

1. A composition, comprising: a modified M/$TiO_2$ composite having a catechol compound adsorbed onto at least the M on the surface of the modified M/$TiO_2$ composite, wherein the modified M/$TiO_2$ composite has a defect-free M/$TiO_2$ interface, wherein the M/$TiO_2$ composite has the characteristic of having a higher CO oxidation activity than that on an oxygen vacancy (Vo)-rich M/$TiO_2$ interface.

2. The composition of claim 1, wherein the M/$TiO_2$ composite is selected from the group consisting of: a $Au/TiO_2$ composite, a $Ag/TiO_2$ composite, a $Cu/TiO_2$ composite, a $Pd/TiO_2$ composite, and a $Pt/TiO_2$ composite.

3. The composition of claim 1, wherein the catechol compound is an oligo-catechol.

4. The composition of claim 3, wherein the oligo-catechol includes 2 to 15 monomers in the backbone of the chain.

5. The composition of claim 3, wherein the oligo-catechol has a molecular weight about 110 to 600 g/mol.

6. The composition of claim 3, wherein the oligo-catechol is selected from one of:

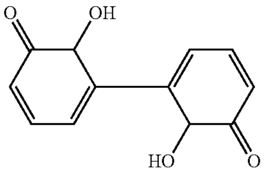

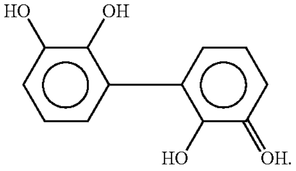

* * * * *